US009547997B2

United States Patent
Rastatter et al.

(10) Patent No.: US 9,547,997 B2
(45) Date of Patent: Jan. 17, 2017

(54) METHODS, SYSTEMS, AND DEVICES FOR MULTI-USER IMPROVEMENT OF READING COMPREHENSION USING FREQUENCY ALTERED FEEDBACK

(71) Applicant: East Carolina University, Greenville, NC (US)

(72) Inventors: Michael Rastatter, Winterville, NC (US); Todd Carter, Greenville, NC (US); Mark Allen, Highlandville, MO (US); Ricardo Rodriguez, Raleigh, NC (US); John Trainor, Morrisville, NC (US)

(73) Assignee: East Carolina University, Greenville, NC (US)

( * ) Notice: Subject to any disclaimer, the term of this patent is extended or adjusted under 35 U.S.C. 154(b) by 197 days.

(21) Appl. No.: 14/138,664

(22) Filed: Dec. 23, 2013

(65) Prior Publication Data

US 2014/0186807 A1    Jul. 3, 2014

Related U.S. Application Data

(60) Provisional application No. 61/748,565, filed on Jan. 3, 2013.

(51) Int. Cl.
*G09B 17/00*    (2006.01)
*G10L 21/007*    (2013.01)
(Continued)

(52) U.S. Cl.
CPC ............... *G09B 17/003* (2013.01); *G09B 5/06* (2013.01); *G09B 5/10* (2013.01); *G09B 17/006* (2013.01);
(Continued)

(58) Field of Classification Search
CPC ....................................................... G09B 17/00
(Continued)

(56) References Cited

U.S. PATENT DOCUMENTS 1,874,480 A * 8/1932 Filene .................. H04R 3/12
                                                        381/80
4,170,834 A    10/1979 Smart
(Continued)

FOREIGN PATENT DOCUMENTS

WO    WO 97/04617    2/1997

OTHER PUBLICATIONS

Declaration of Facts Describing Field Test of Prototype, executed Jan. 28, 2013, 3 pages.
(Continued)

*Primary Examiner* — Sam Yao
*Assistant Examiner* — Alvin Carlos
(74) *Attorney, Agent, or Firm* — Myers Bigel, P.A.

(57) ABSTRACT

Multi-user portable electronic devices for improving reading ability and/or comprehension for a plurality of subjects are provided. The multi-user portable electronic devices may include a pitch shifter circuit configured to generate frequency altered auditory speech feedback (FAF) signals corresponding to respective auditory speech signals received from respective active microphones, and to transmit the respective FAF signals to the plurality of subjects while one or more of the plurality of subjects are respectively reading aloud, to improve the plurality of subjects' reading ability and/or comprehension. The multi-user portable electronic devices may also include a switch configured to activate the microphones selectively, serially. Related methods and systems are also described.

39 Claims, 19 Drawing Sheets

(51) Int. Cl.
*H04R 1/04* (2006.01)
*G09B 5/06* (2006.01)
*G09B 5/10* (2006.01)
*H04R 27/00* (2006.01)

(52) U.S. Cl.
CPC .............. *G10L 21/007* (2013.01); *H04R 1/04* (2013.01); *H04R 27/00* (2013.01); *H04R 2499/11* (2013.01)

(58) Field of Classification Search
USPC .......................................................... 434/169
See application file for complete search history.

(56) References Cited

U.S. PATENT DOCUMENTS

| | | | |
|---|---|---|---|
| 4,464,119 A | 8/1984 | Vildgrube et al. | |
| 4,727,582 A | 2/1988 | de Vries et al. | |
| D303,246 S | 9/1989 | Freeman et al. | |
| 4,895,519 A | 1/1990 | Beller et al. | |
| 5,133,016 A | 7/1992 | Clark | |
| D344,800 S | 3/1994 | Lamby | |
| D372,703 S | 8/1996 | Hannon et al. | |
| 5,659,156 A | 8/1997 | Mauney et al. | |
| 5,765,134 A * | 6/1998 | Kehoe ................. | G10L 21/0208 381/61 |
| 5,794,203 A * | 8/1998 | Kehoe ....................... | A61F 5/58 704/271 |
| 5,812,659 A | 9/1998 | Mauney et al. | |
| 5,940,798 A | 8/1999 | Houde | |
| 5,961,443 A | 10/1999 | Rastatter et al. | |
| 5,995,932 A | 11/1999 | Houde | |
| 6,230,049 B1 | 5/2001 | Fischell et al. | |
| 6,231,500 B1 | 5/2001 | Kehoe | |
| D461,453 S | 8/2002 | Chen | |
| D462,953 S | 9/2002 | Jang | |
| D462,954 S | 9/2002 | Chen | |
| D469,081 S | 1/2003 | Perszyk et al. | |
| 6,644,973 B2 * | 11/2003 | Oster ..................... | G09B 19/04 434/156 |
| D485,830 S | 1/2004 | Chen | |
| D487,074 S | 2/2004 | McGoldrick | |
| 6,745,014 B1 | 6/2004 | Seibert et al. | |
| D503,384 S | 3/2005 | Weatherley | |
| 6,925,185 B2 * | 8/2005 | Chung ................. | H04R 29/004 381/123 |
| D521,504 S | 5/2006 | Nagel et al. | |
| D531,129 S | 10/2006 | Muto | |
| D545,768 S | 7/2007 | Hsu | |
| D553,572 S | 10/2007 | Yi et al. | |
| D566,045 S | 4/2008 | Chang | |
| D595,239 S | 6/2009 | Inoue et al. | |
| D600,213 S | 9/2009 | Inoue et al. | |
| 7,828,712 B2 | 11/2010 | Rastatter et al. | |
| 8,036,896 B2 * | 10/2011 | Adams, Jr. ............. | G09B 19/04 434/178 |
| D699,299 S | 2/2014 | Bruker | |
| D716,375 S | 10/2014 | Rastatter et al. | |
| 2001/0007050 A1 | 7/2001 | Adelman | |
| 2002/0116462 A1* | 8/2002 | DiGiano ................... | G09B 7/02 709/205 |
| 2005/0095564 A1* | 5/2005 | Stuart ..................... | G09B 19/04 434/112 |
| 2005/0171926 A1* | 8/2005 | Thione ................... | G10L 15/22 |
| 2006/0089522 A1* | 4/2006 | Rastatter ................... | A61F 5/58 600/23 |
| 2007/0049788 A1* | 3/2007 | Kalinowski ............ | G09B 19/04 600/23 |
| 2007/0244703 A1* | 10/2007 | Adams, Jr. ............. | G09B 19/04 704/270.1 |
| 2007/0250761 A1* | 10/2007 | Bradley ............ | H04L 29/06027 715/203 |
| 2008/0003559 A1* | 1/2008 | Toyama ................... | G09B 7/02 434/350 |
| 2008/0177822 A1* | 7/2008 | Yoneda ................. | H04L 12/282 709/202 |
| 2010/0100388 A1* | 4/2010 | Kehoe ................. | G10L 21/0364 704/271 |
| 2012/0301859 A1 | 11/2012 | Rastatter et al. | |
| 2014/0323036 A1* | 10/2014 | Daley .................... | H04H 20/08 455/3.06 |

OTHER PUBLICATIONS

Carter et al. "The effects of frequency altered feedback on the reading processes of adults with reading disorders", *Neuroscience Letters*, vol. 461,69-73, 2009.

International Search Report and Written Opinion Corresponding to International Application No. PCT/US2013/077458; Date of Mailing: Apr. 11, 2014; 12 Pages.

Armson, J. et al., *Effect of frequency altered feedback and audience size on stutterin*, European Journal of Disorders in Communication, 32, pp. 359-366, 1997.

Armson et al., *Interpreting Results of the Fluent Speech Paradigm in Stuttering Research: Difficulties in Separating Cause From Effect*, Journal of Speech and Hearing Research, v. 37, pp. 69-82, Feb. 1994.

Black, J., *The effect of delayed side-tone upon vocal rate and intensity*, Journal of Speech and Hearing Disorders, 16, pp. 56-60, 1951.

Boller, F. et al; *Delayed Auditory Feedback and Aphasia*, Cortex 14, pp. 212-226, 1978.

Breznitz, Zvia, *Enhancing the Reading of Dyslexic Children by Reading Acceleration and Auditory Masking*, Journal of Educational Psychology, 1997, vol. 89, No. 1, pp. 105-113.

Burke, B., *Susceptibility to delayed auditory feedback and dependence on auditory or oral sensory feedback*, Journal of Communication Disorders, 8, pp. 75-96, 1975.

Chapin, C. et al, *Speech Production Mechanisms in Aphasia: A Delayed Auditory Feedback Study*; Brain and Language, 14, pp. 106-113, 1981.

Dayalu, V. et al., *Active Inhibition of Stuttering Results in Pseudofluency: A Reply to Craig*, Perceptual and Motor Skills, 94, pp. 1050-1052, 2002.

Dayalu, V. et al., *Producing the vowel/a/ prior to speaking inhibits stuttering in adults in the English language*, Neuroscience Letters 306, pp. 111-115, 2001.

Dayalu, V. et al., *Pseudofluency in Adults Who Stutter: The Illusory Outcome of Therapy*, Perceptual and Motor Skills, 94, pp. 87-96, 2002.

Dayalu, V. et al., *Stuttering Frequency on Content and Function Words in Adults Who Stutter: A Concept Revisited*, Journal of Speech, Language, and Hearing Research, vol. 45, pp. 871-878, Oct. 2002.

Dayalu, V. et al., *Stuttering therapy results in pseudofluency*, Int. J. Lang. Comm. Dis., vol. 36, Letters to Editor, No. 3, pp. 405-408, 2001.

Dobbs, R.J. et al., *Assessment of the bradyphrenia of parkinsonism: a novel use of delayed auditory feedback*, ACTA Neurol Scand 87, pp. 262-267, 1993.

Downie, A.W. et al., *Speech Disorder in Parkinsonism—Usefulness of Delayed Auditory Feedback in Selected Cases*, BJDC, vol. 16.2, pp. 135-139, 1981.

Downie, A.W. et al., *Speech disorder in Parkinsonism; use of delayed auditory feedback in selected cases*, Journal of Neurology, Neurosurgery, and Psychiatry, 44, pp. 852, 1981.

Gillis et al., *The Influence of Differential Auditory Feedback Upon the Reading of Dyslexic Children*, Neuropsychologia, 1978, vol. 16, pp. 483-489.

Hanson, W.R. et al., *DAF as Instrumental Treatment for Dysarthria in Progressive Supranuclear Palsy: A Case Report*; Journal of Speech and Hearing Disorders, pp. 268-276, May 1980.

Hargrave, S. et al., *Effect of frequency-altered feedback on stuttering frequency at normal and fast speech rates*, Journal of Speech and Hearing Research, 37, pp. 1313-1319, 1994.

(56) References Cited

OTHER PUBLICATIONS

Harper, L.V. et al., *Speech Self-Monitoring in Preschoolers: The Effects of Delayed Auditory Feedback on Recitation*, Perceptual and Motor Skills, 90, pp. 1157-1170, 2000.
Harris, J., *Social neuroscience, empathy, brain integration, and neurodevelopmental disorders*, Physiology & Behavior vol. 79, pp. 525-531, 2003.
Hearit Complete Auditory Tool Kit, Auditory Tools by Hearit Company, http://www.hearitllc.com/prodr.htm., (six sheets) unknown date, but for exam purposes will be deemed to be prior to Apr. 25, 2002.
Hughes, Mike, *Electronic Fluency: The Future Stuttering Solution*, Speaking Out, vol. 19, No. 3, pp. 1-25, Mar. 2002.
http://www.kayelemetrics.com, Section 10—Using Auditory Feedback in School Settings, 7 pages, © 1996-2007 KayPENTAX, printed from websire on Jan. 25, 2008.
http://www.micro-dsp.com/eng1/product.html#AudioPRO, Micro-DSP Technology Co. Ltd, AudioPRO, 9 sheets, © 2002.
*Jabra FreeSpeak BT200 wireless cellphone earset (included with Pocket Fluency System)*, Pocket Fluency System™, http://www.casafuturatech.com/catalog/pfscatalog.html, unknown date, but for exam purposes will be deemed to be prior to Apr. 25, 2002.
*Jabra Ear-Bud Cellphone earset (included with Pocket Fluency System)*, Pocket Fluency System™, http://www.casafuturatech.com/Catalog/pfscatalog.html, unknown date, but for exam purposes will be deemed to be prior to Apr. 25, 2002.
Kalinowski, J. et al., *A common element in the immediate inducement of effortless, natural-sounding, fluent speech in people who stutter: 'the second speech signal'*, Medical Hypotheses, 58(1), pp. 61-66, 2002.
Kalinowski, J. et al., *Cautionary notes on interpreting the efficacy of treatment programs for children who stutter*, Int. j. Lang. Comm. Dis., vol. 37, No. 3, pp. 359-361, 2002.
Kalinowski, J. et al., *Effects of Monitoring Condition and Frequency-Altered Feedback on Stuttering Frequency*, Journal of Speech, Language, and Hearing Research, vol. 42, pp. 1347-1354, Dec. 1999.
Kalinowski, J. et al., *Mnemonics Helpful for Physician-Patient Communication*, Family Medicine, Letters to the Editor, pp. 7-8, Jan. 2003.
Kalinowski, J. et al., *Re: Second speech signals versus prolonged speech techniques: a reply to Onslow*, Int. J. Lang. Comm. Dis., Letter to Editor, 3 sheets, 2001.
Kalinowski, J. et al., *Self-reported efficacy of an all in-the-ear-canal prosthetic device to inhibit stuttering during one hundred hours of university teaching: an autobiographical clinical commentary*, Disability and Rehabilitation, vol. 25, No. 2, pp. 107-111, 2003.
Kalinowski, J. et al., *Stutter-free and stutter-filled speech signals and their role in stuttering amelioration for English speaking adults*, Neuroscience Letters 293, pp. 115-118, 2000.
Kalinowski, J. et al., *The Efficacy of the SpeechEasy™ Protocol for Managing Stuttering: 4 Month Data. Poster Presentation at ASHA Convention*, pp. 1-15, Nov. 21, 2002.
Kalinowski, J. et al., *Inducement of fluent speech in persons who stutter via visual choral speech*, Neuroscience Letters 281, pp. 198-200, 2000.
Kalinowski, J. et al., *Choral speech: the amelioration of stuttering via imitation and themirror neuronal system*, Neuroscience and Biobehavioral Reviews, pp. 339-347, 2003.
Kalinowski, J. et al., *Speaking with a mirror: engagement of mirror neurons via choral speech and its derivatives induces stuttering inhibition*, Medical Hypotheses 60(4), pp. 538-543, 2003.
Kershner, et al., *Modified Voice Feedback Improves Letter naming in Reading Disabled Children with Central Auditory Dysfunction*, Journal of Clinical Child Psychology, 1985, Viol. 14, No. 2, pp. 157-161.
Kohler, E. et al., *Hearing Sounds, Understanding Actions: Action Representation in Mirror Neurons*, Science vol. 297, pp. 846-848, Aug. 2002.
*Labtec Axis-002 (included with Pocket Fluency System) Pocket Fluency System™*, http://www.casafuturatech.com/Catalog/pfscatalog.html, unknown date, but for exam purposes will be deemed to be prior to Apr. 25, 2002.
Langova, J. et al., *Experimental interference with auditory feedback*, Folia Phoniatrica, 22, pp. 191-196, 1970.
Lee, B.S., *Effects of delayed speech feedback*, Journal of the Acoustical Society of America, 22, pp. 824-826, 1950.
Lee, B.S., *Artificial stutterer*, Journal of Speech and Hearing Disorders, 16, pp. 53-55, 1951.
Levy et al., *Fast and Slow Namers: Benefits of Segmentation and Whole Word Training* Journal of Experimental Child Psychology 73:115-138, 1999.
Lozano, R.A. et al., *Some Effects of Delayed Auditory Feedback on Dyspraxia of Speech*, Journal of Communication Disorders, 11, pp. 407-415, 1978.
McCormick, B., *Therapeutic and Diagnostic Applications of Delayed Auditory Feedback*, British Journal of Disorders of Communication, 10, pp. 98-110, 1975.
New HEARIT se, LDS Newsbriefs, vol. 37, No. 2, pp. 15, Mar./Apr. 2002.
Rastatter et al., *Quantitative Electroencephalogram of Posterior Cortical Areas of Fluent and Stuttering Participants During Reading With Normal and Altered Auditory Feedback*, Perceptual and Motor Skills, 1998, 87, pp. 623-633.
Rastatter et al. *The Effects of Frequency Altered Feedback on Reading Comprehension Abilities of Normal and Reading Disordered Children* Neuroscience Letters 416:266-271, 2007.
Rizzolatti, G. et al., *Language within our grasp*, Trends Neurosci vol. 21, No. 5, pp. 188-194, 1998.
Salame and Baddeley. *Noise, Unattended Speech and Short-Term Memory* Ergonomics 30(8):1185-1194, 1987.
Saltuklaroglu, T. et al., *Reduction of stuttering: the dual inhibition hypothesis*, Medical Hypotheses, 58(1), pp. 67-71, 2002.
Saltuklaroglu, T. et al., *Say it with me: Stuttering Inhibited*, Journal of Clinical and Experimental Neuropsychology, vol. 00, No. 0, pp. 1-8, 2003.
Saltuklaroglu, T. et al., *SpeechEasy™ Hardware, Software Installation, and Treatment Protocol Manual*, Version 3.0 Stuttering Research Group LLC, pp. 1-52, © 2002.
Saltuklaroglu, T. et al., *The end-product of behavioural stuttering therapy: three decades of denaturing the disorder*, Disability and Rehabilitation, vol. 24, No. 15, pp. 786-789, 2002.
Saltuklaroglu, T. et al., *A temporal window for the central inhibition of stuttering via exogenous speech signals in adults*, Neuroscience Letters, pp. 1-5, 2003.
Sapir et al., *Linguistic and nonlinguistic auditory processing of rapid vowel formant (F2) modulations in university students with and without developmental dyslexia*, Brain Cogn. Mar.-Apr. 2002; 48(2-3):520-6, http://www.ncbi.nlm.nih.gov/entrez/query.fcgi?cmd=Retrieve&db=PubMed&list_uids=12030500 &dopt=Abstract, 1 page.
*Speaking Freely*, People, pp. 112, Sep. 16, 2002.
Stager, S.V. et al., *Modifications in Aerodynamic Variables by Persons Who Stutter Under Fluency-Evoking Conditions*, JSLHR, vol. 40, pp. 832-847 Aug. 1997.
Stager, S.V. et al., *Speech Production Changes Under Fluency-Evoking Conditions in Nonstuttering Speakers*, Journal of Speech and Hearing Research, vol. 36, pp. 245-253, Apr. 1993.
Stager, S.V. et al., *The Effects of Fluency-Evoking Conditions on Voicing Onset Types in Persons Who do and do not Stutter*, J. Commun. Disord., 31, pp. 33-52, 1998.
Stuart, A. et al., *Investigations of the Impact of Altered Auditory Feedback In-The-Ear Devices on the Speech of People Who Stutter: Initial Fitting and Four-Month Follow-up*, International Journal of Language & Communication Disorders, pp. 1-48, Date Unknown but believed to be before Oct. 2002.
Stuart, A., *Effect of delayed auditory feedback on normal speakers at two speech rates*, J. Acoust. Soc. AM. 111 (5) Pt. 1, pp. 2237-2241, May 2002.
Stuart, A. et al., *Self-Contained In-the-Ear Device to Deliver Altered Auditory Feedback: Applications for Stuttering*, Annals of Biomedical Engineering, vol. 31, pp. 233-237, 2003.

(56) References Cited

OTHER PUBLICATIONS

Stuart, A. et al., *Effect of monaural and binaural altered auditory feedback on stuttering frequency*, J. Accoust. Soc. Am. 101, pp. 3806-3809, Jun. 1997.

Stuart, A. et al., Abstract *Effect of DAF on Normal Speakers at normal and fast Speech Rates*, 13 pages, Date unknown but believed to be before Oct. 2002.

Tansey et al., *EMG and EEG Biofeedback Training in the Treatment of a 10-Year-Old Hyperactive Boy with a Developmental Reading Disorder*, Biofeedback and Self-Regulation, vol. 8, No. 1, 1983.

Tansey, *EEG Sensorimotor Rhythm Biofeedback Training: Some Effects on the Neurologic Precursors of Learning Disabilities*, International Journal of Psychophysiology, (1984), vol. 1, pp. 163-177.

*The Second Generation Design of SpeechEasy*, Micro-DSP Technology Co., Ltd., 2 sheets, date unknown but believed to be before Oct. 2002.

Umilta, M. et al., *I know What You are Doing: A Neurophysiological Study*, Neuron vol. 31, pp. 1-20, Jul. 2001.

Vrtunski, P.B. et al., *Response to Delayed Auditory Feedback in Patients with Hemispheric Lesions*; Cortex, 12, pp. 395-404, 1976.

Whats New With Hearit??, (2 sheets), http://www.hearitlle.com/new1.html , unknown date, but for exam purposes will be deemed to be prior to Apr. 25, 2002.

Wile and Borowsky. *What Does Rapid Automatized Naming Measure? A New RAN Task Compared to Naming and Lexical Decision* Brain and Language 90:47-62, 2004.

Williams, JHG et al., *Imitation, mirror neurons and autism*, Neuroscience and Biobehavioral Reviews 25 pp. 287-295, 2001.

Wolf and Bowers, *The Double-Deficit Hypothesis for the Developmental Dyslexias* Journal of Educational Psychology 91(3):415-438, 1999.

\* cited by examiner

METHODS, SYSTEMS, AND DEVICES FOR MULTI-USER IMPROVEMENT OF READING COMPREHENSION USING FREQUENCY ALTERED FEEDBACK

CLAIM OF PRIORITY

The present application claims the benefit of and priority to U.S. Provisional Patent Application Ser. No. 61/748,565, filed on Jan. 3, 2013, entitled METHODS, SYSTEMS, AND DEVICES FOR MULTI-USER IMPROVEMENT OF READING COMPREHENSION USING FREQUENCY ALTERED FEEDBACK, the disclosure of which is hereby incorporated herein in its entirety by reference

FIELD

The present invention relates to methods, systems, and devices for improving reading ability/comprehension.

BACKGROUND

Many children and adults suffer from reading disorders. For example, a student may have a reading ability (e.g., reading comprehension) level below that of typical students in his or her grade. Treatments that attempt to increase reading ability levels and comprehension may be expensive and/or strenuous. Accordingly, there remains a need for effectively and efficiently improving reading ability and comprehension.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Various embodiments of the present inventive concepts include methods for improving reading ability (and/or comprehension) for a plurality of subjects. The methods may include providing a portable device in communication with a plurality of different microphones. The methods may include electronically activating a first microphone associated with a first subject using the portable device. The methods may include electronically receiving an auditory speech signal of the first subject using the first microphone. The methods may include electronically altering the received auditory speech signal to generate a first frequency altered auditory speech feedback (FAF) signal. The methods may include electronically administering the first FAF signal to the first subject while the first subject is speaking, to improve the first subject's reading ability (and/or comprehension). Then, the methods may include electronically activating a second microphone associated with a second subject using the portable device. The methods may include electronically receiving an auditory speech signal of the second subject using the second microphone. The methods may include electronically altering the received auditory speech signal of the second subject to generate a second FAF signal. The methods may include electronically administering the second FAF signal to the second subject while the second subject is speaking, to improve the second subject's reading ability (and/or comprehension).

According to various embodiments, electronically administering the first FAF signal to the first subject may be carried out to electronically administer the first FAF signal concurrently to the first and second subjects while the first subject is speaking to thereby improve the first and second subjects' reading ability (and/or comprehension).

In various embodiments, electronically administering the second FAF signal to the second subject may be carried out to electronically concurrently administer the second FAF signal to the first and second subjects while the second subject is speaking to thereby improve the first and second subjects' reading ability (and/or comprehension).

According to various embodiments, the activating steps may be carried out using an externally accessible manual switch on board the portable device.

In various embodiments, the activating steps may be carried out using a remote input associated with a display that is in communication with the portable device.

Some embodiments provide that electronically activating the second microphone may be carried out to substantially concurrently deactivate the first microphone corresponding to the first subject.

According to various embodiments, electronically altering the auditory speech signal of the first subject may include electronically converting the received analog auditory speech signal to a digital signal in a frequency domain, electronically altering the frequency of the digital signal within a range of +/−2 octaves, then electronically converting the altered digital signal back to a time domain and into an analog signal to generate the first FAF signal that is administered to the first subject.

In various embodiments, receiving the auditory speech signal of the first subject may include receiving the auditory speech signal of the first subject using a microphone corresponding to a headset worn by the first subject.

According to various embodiments, the portable device may include a multi-user portable electronic device. At least one of the steps of converting the received analog signal, altering the digital signal, and converting the altered digital signal may be at least partially carried out using circuitry in the multi-user portable electronic device.

In various embodiments, the multi-user portable electronic device may include a wireless device that is remote from a headset worn by the first subject.

According to various embodiments, the multi-user portable electronic device may include a wired device that is remote from a headset worn by the first subject.

In various embodiments, each of the first and second subjects may have a reading disorder. The steps of administering may be carried out as therapeutic treatment to improve the first and second subjects' reading ability (and/or comprehension).

According to various embodiments, the methods may further include programmably adjusting a frequency shift for the step of electronically altering the received auditory speech signal to generate the first FAF signal using an electronic device that includes a display.

In various embodiments, the first subject may be a preschool, primary school, elementary school, middle school, or high school age student.

According to various embodiments, the methods may be carried out in a school setting.

In various embodiments, the first subject may be a college student.

According to various embodiments, the first subject may be an adult with a reading disorder.

Systems for improving reading ability (and/or comprehension) for a plurality of subjects, according to various embodiments, may include a first headset and a second headset. The systems may include first and second microphones configured to communicate with the first and second headsets, respectively. The systems may include a portable electronic device configured to electronically communicate with respective first and second microphones to serially, selectively generate a first frequency altered auditory speech feedback (FAF) signal associated with an auditory speech signal received by the first microphone and a second FAF signal associated with an auditory speech signal received by the second microphone, and transmit the first and second FAF signals to first and second subjects using the first and second headsets, respectively, while the first and second subjects are reading aloud, to improve the first and second subjects' reading ability (and/or comprehension). In some embodiments, the systems may include an electronic device that includes a display and is configured to communicate with the portable electronic device and provide programmable selection of and/or adjustment of the first and second FAF signals.

In various embodiments, the first and second subjects may each concurrently, serially receive both the first and second FAF signals.

According to various embodiments, the portable electronic device may be remote from the first and second headsets and may wirelessly communicate with the first and second microphones to generate the first and second FAF signals so that first and second frequencies, respectively, are shifted a desired amount within a range of between +/−2 octaves.

In various embodiments, the portable electronic device may be a device that is releasably wired to the first and second microphones to generate the first and second FAF signals so that first and second frequencies, respectively, are shifted a desired amount within a range of between +/−2 octaves.

According to various embodiments, the systems may be configured to treat a school age student with a reading disability, to improve reading ability (and/or comprehension).

In various embodiments, the systems may be configured to treat an adult with a reading disability, to improve reading ability (and/or comprehension).

Multi-user portable electronic devices for improving reading ability (and/or comprehension) for a plurality of subjects, according to various embodiments, may include a pitch shifter circuit configured to generate frequency altered auditory speech feedback (FAF) signals corresponding to respective auditory speech signals received from respective active microphones, and to transmit the respective FAF signals to the plurality of subjects while one or more of the plurality of subjects are respectively reading aloud, to improve the plurality of subjects' reading ability (and/or comprehension). The multi-user portable electronic devices may include a switch in communication with the circuit configured to activate the microphones selectively, serially.

In various embodiments, each of the plurality of subjects may receive each of the FAF signals.

According to various embodiments, the multi-user portable electronic devices may include a headset interface configured to transmit the auditory speech signals from the microphones and/or to transmit the FAF signals to headsets corresponding to the microphones. The multi-user portable electronic devices may include a data interface configured to communicate with an electronic device that includes a display and a software application that manages the multi-user portable electronic device.

In various embodiments, the software application may be configured to open when the software application detects that the multi-user portable electronic device is connected to the electronic device that includes the display and the software application.

According to various embodiments, the software application may include a graphical user interface that is configured to allow a user to selectively start and/or stop processing of the auditory speech signals, and/or adjust volume levels of the auditory speech signals and/or the FAF signals.

In various embodiments, the data interface may include a Universal Serial Bus (USB) port. The electronic device that includes the display and the software application may include a desktop, laptop, tablet, netbook, or notebook computer, or a smart phone. The software application may be stored in a non-transitory memory of the desktop, laptop, tablet, netbook, notebook computer, or smart phone.

According to various embodiments, the software application may be configured to track the FAF signals and to generate charts and/or graphs on the display to illustrate reading ability (and/or comprehension) progress of the plurality of subjects.

In various embodiments, the software application may provide programmable selection and/or adjustment of the FAF signals.

According to various embodiments, the multi-user portable electronic devices may include a non-volatile memory. The multi-user portable electronic devices may be fully functional only in response to cooperation between the software application and a license file stored in the non-volatile memory.

In various embodiments, the license file may correspond to a license that expires, such that the multi-user portable electronic devices can be deactivated or are configured to be fully functional only before the license expires.

According to various embodiments, the headset interface may include a plurality of headset ports configured to connect the multi-user portable electronic devices with the headsets. The headsets may include between two and six headsets. In other words, the number of headsets may be two, three, four, five, or six headsets.

In various embodiments, the headset ports may be configured to receive the auditory speech signals from the respective microphones and to transmit the FAF signals to earphones of the respective headsets.

According to various embodiments, the multi-user portable electronic devices may include a visual indicator of the activated microphone.

In various embodiments, the portable electronic device may have a portable housing, and the visual indicator may include Light Emitting Diodes (LEDs) held by the housing that serially illuminate to indicate which microphone is active.

According to various embodiments, the multi-user portable electronic devices may include a digital-to-analog converter configured to convert digital audio signals generated by the software application and/or the multi-user portable electronic devices into analog audio signals to be transmitted to the headsets. The analog audio signals may include the FAF signals.

In various embodiments, the multi-user portable electronic devices may include an on-board microphone biasing and input amplifier circuit configured to process the auditory speech signals received from the headsets.

According to various embodiments, the multi-user portable electronic devices may include an on-board headset amplifier circuit configured to amplify the FAF signals that are to be transmitted to the headsets.

It is noted that aspects of the invention described with respect to one embodiment may be incorporated in a different embodiment although not specifically described relative thereto. That is, all embodiments and/or features of any embodiment can be combined in any way and/or combination. Applicants reserve the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 4A is a top side perspective view of a multi-user portable electronic device. FIG. 4B is a top view of the device shown in FIG. 4A. FIG. 4C is an end view of the device shown in FIG. 4A, and FIG. 4D is an opposing end view of the device shown in FIG. 4A.

DETAILED DESCRIPTION

Figure 1A:
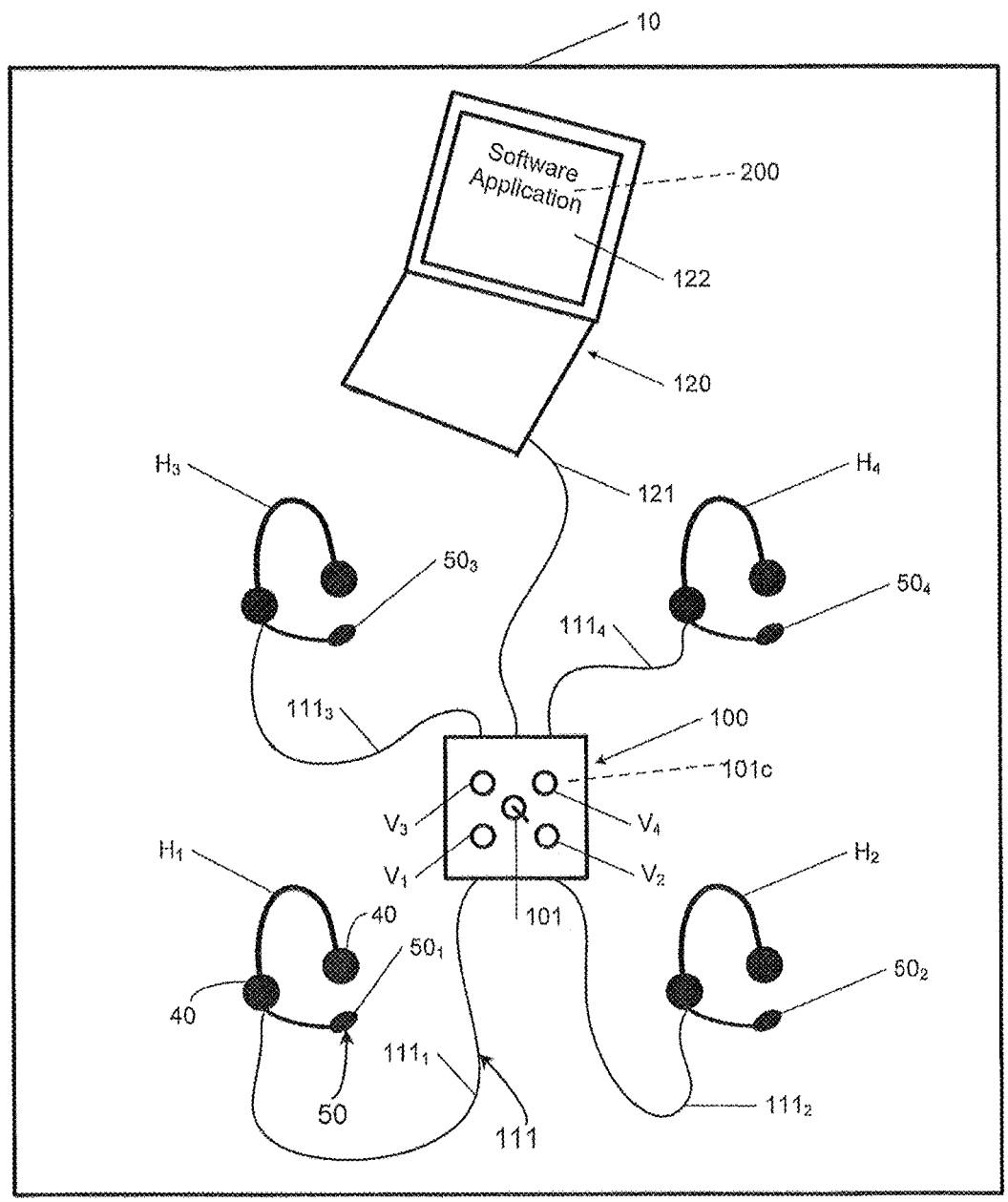
FIGS. 1A-1C are schematic illustrations of a system for improving reading ability and/or comprehension for a plurality of subjects, according to various embodiments.

Specific exemplary embodiments of the inventive concepts now will be described with reference to the accompanying drawings. The inventive concepts may, however, be embodied in a variety of different forms and should not be construed as limited to the embodiments set forth herein. Rather, these embodiments are provided so that this disclosure will be thorough and complete, and will fully convey the scope of the inventive concepts to those skilled in the art. In the drawings, like designations refer to like elements. Moreover, certain features, components, layers and/or regions in the drawings may be exaggerated for clarity.

It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

The term "about" means that the recited number or value can vary by +/−20%. Moreover, the term "FAF signal" refers to an auditory speech signal that is generated in response to a person speaking (e.g., reading aloud) and that has been shifted in frequency/pitch and provided as an altered feed auditory speech signal to the person to stimulate mechanisms in the person's brain responsible for phonological processing.

Exemplary embodiments of the present invention may be embodied as systems, methods, and multi-user portable electronic devices. Accordingly, exemplary embodiments of the present invention may be embodied in hardware and/or in software (including firmware, resident software, microcode, etc.). Furthermore, exemplary embodiments of the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Exemplary embodiments of the present invention are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Other systems and/or methods according to embodiments of the invention will be or become apparent to one with skill in the art upon review of the following drawings and detailed description. It is intended that all such additional systems, methods, and/or devices be included within this description, be within the scope of the present invention, and be protected by the accompanying claims.

A. Systems for Improving Reading Ability/Comprehension for a Plurality of Subjects Referring now to FIG. 1A, a schematic illustration is provided of a system 10 for improving reading ability and/or comprehension for a plurality of subjects. The subjects may include users, patients, and/or students, among other users of the system 10. As shown, the system 10 may include a multi-user portable electronic device 100, a plurality of headsets $H_1$-$H_4$, and an electronic device 120 that includes a display 122. The headsets $H_1$-$H_4$ may be worn by respective subjects while one or more of the subjects are reading aloud. In particular, the multi-user portable electronic device 100 may be configured to receive a speech signal from one of the subjects, generate a frequency altered auditory speech feedback (FAF) signal based on the speech signal, and transmit the FAF signal to the respective headsets $H_1$-$H_4$ of the subjects, while one of the subjects is reading aloud, to improve the subjects' reading ability and/or comprehension.

The headsets $H_1$-$H_4$ may include respective microphones 50 ($50_1$, $50_2$, $50_3$, and $50_4$, respectively) configured to provide speech signals (e.g., auditory speech signals) to the multi-user portable electronic device 100. The headsets $H_1$-$H_4$ may each include one or two earphones 40 (shown as two) configured to provide FAF signals and/or other audio signals from the multi-user portable electronic device 100 to the subjects. The multi-user portable electronic device 100 may be remote from the headsets $H_1$-$H_4$, and the same multi-user portable electronic device 100 may be used by all of the headsets $H_1$-$H_4$.

The multi-user portable electronic device 100 may include a switch 101 configured to select (e.g., activate) a particular microphone 50 (i.e., one of the microphones $50_1$, $50_2$, $50_3$, or $50_4$) corresponding to one of the headsets $H_1$-$H_4$. The multi-user portable electronic device 100 may include respective visual indicators $V_1$-$V_4$ configured to indicate that a particular microphone 50 is active. The visual indicators $V_1$-$V_4$ may include, for example, lights such as Light Emitting Diodes (LEDs). Moreover, it will be understood that a headset H described herein shall refer to any one of the headsets $H_1$-$H_4$, and that a visual indicator V described herein shall refer to any one of the visual indicators $V_1$-$V_4$.

The switch 101 can have an external user interface (e.g., a knob, dial, or the like, or a Graphical User Interface (GUI) on a display) on an outer surface of the multi-user portable electronic device 100. The switch 101 may have the same number of positions (e.g., four (4)) as the number of subjects/headsets $H_1$-$H_4$. Accordingly, a person supervising the subjects undergoing treatment may be able to select a microphone 50 corresponding to one of the headsets $H_1$-$H_4$ by manually/physically manipulating the switch 101 to a particular one of the positions. The person supervising the subjects may generally be referred to as a "user" or "reading supervisor" and may be a teacher, teacher assistant, language professional, therapist, parent, etc. In particular, the switch 101 may be a knob that a user may physically rotate to select a microphone 50 of a particular headset H.

Additionally or alternatively, the multi-user portable electronic device 100 may include microphone switching circuitry 101c in the multi-user portable electronic device 100 that may be controlled by the user via the electronic device 120 that has the display 122. The display 122 can present a GUI with a touch screen selection or mouse/cursor selection of different microphones $50_1$-$50_4$. For example, the user may select (e.g., touch or click) icons or other boxes or buttons labeled one (1) through four (4) displayed on the display 122 to operate the switching circuitry 101c. The system 10 can also switch between different microphones $50_1$-$50_4$ at defined time intervals. As such, in some embodiments, the user may activate a microphone 50 of a particular headset H without physically touching the manual switch 101. Indeed, the on-board external switch 101 is not required in some embodiments.

As described herein, a visual indicator V may indicate that a corresponding headset H is selected by the switch 101/switching circuitry 101c. In particular, a visual indicator V indicates that a microphone 50 of a corresponding headset H is active (e.g., may transmit signals to the multi-user portable electronic device 100 and/or earphones 40 of the headsets $H_1$-$H_4$). As an example, if the switch 101/switching circuitry 101c changes from making the first headset $H_1$ microphone active to making the microphone of the second headset $H_2$ active, then the second visual indicator $V_2$ can reflect this change visually. The visual indicators $V_1$-$V_4$ may be visually noticeable/sufficiently bright that a user working with the subjects can see the visual indicators $V_1$-$V_4$ from a suitable distance such as 1'-5', or greater, across a table/room where the subjects are seated. For example, an LED corresponding to the first headset $H_1$ may light up if the switch 101/switching circuitry 101c selects the first headset $H_1$, and an LED corresponding to the second headset $H_2$ may light up if the switch 101/switching circuitry 101c selects the second headset $H_2$. The visual indicators $V_1$-$V_4$ may also or alternatively be on the headsets $H_1$-$H_4$ themselves.

Moreover, it will be understood that using the switch 101/switching circuitry 101c to switch from selecting the first headset $H_1$ to selecting the second headset $H_2$ may deactivate transmissions from the microphone $50_1$ of the first headset $H_1$ to the multi-user portable electronic device 100 and/or to earphones 40 of the headsets $H_1$-$H_4$. In some embodiments, the multi-user portable electronic device 100 is configured so that only one microphone 50 is active at any one time, but the FAF signal generated by the selected/activated headset H/microphone 50 and the multi-user portable electronic device 100 can be transmitted concurrently to all of the headsets $H_1$-$H_4$.

The electronic device 120 having the display 122 may include a computer, television, and/or mobile phone (e.g., a smart phone), among other devices. It will be understood that a computer may include a desktop, laptop, netbook, tablet computer, and the like. The electronic device 120 having the display 122 may be configured to communicate with the multi-user portable electronic device 100, and may allow programmable selection and/or adjustment of FAF signals. For example, the electronic device 120 may include a keyboard, keypad, touchpad, mouse, etc. for selecting/adjusting FAF signals in conjunction with an application (e.g., a software application) displayed on the display 122. The electronic device 120 having the display 122 may communicate with the multi-user portable electronic device 100 via a data interface 121. The data interface 121 may be a wired and/or wireless interface. For example, the data interface 121 may include a Universal Serial Bus (USB) port and USB cable, a Bluetooth interface, a Wi-Fi interface, and/or the like.

Similarly, the headsets $H_1$-$H_4$ may communicate with the multi-user portable electronic device 100 via respective wired and/or wireless headset interfaces 111 ($111_1$, $111_2$, $111_3$, and $111_4$, respectively). For example, the first headset $H_1$ may releasably connect to an audio port of the multi-user portable electronic device 100 via a cable that can be released from the audio port. The cable may be configured to transmit auditory speech signals from a subject to the multi-user portable electronic device 100, and to receive FAF signals and/or other audio signals from the multi-user portable electronic device 100.

Figure 1B:
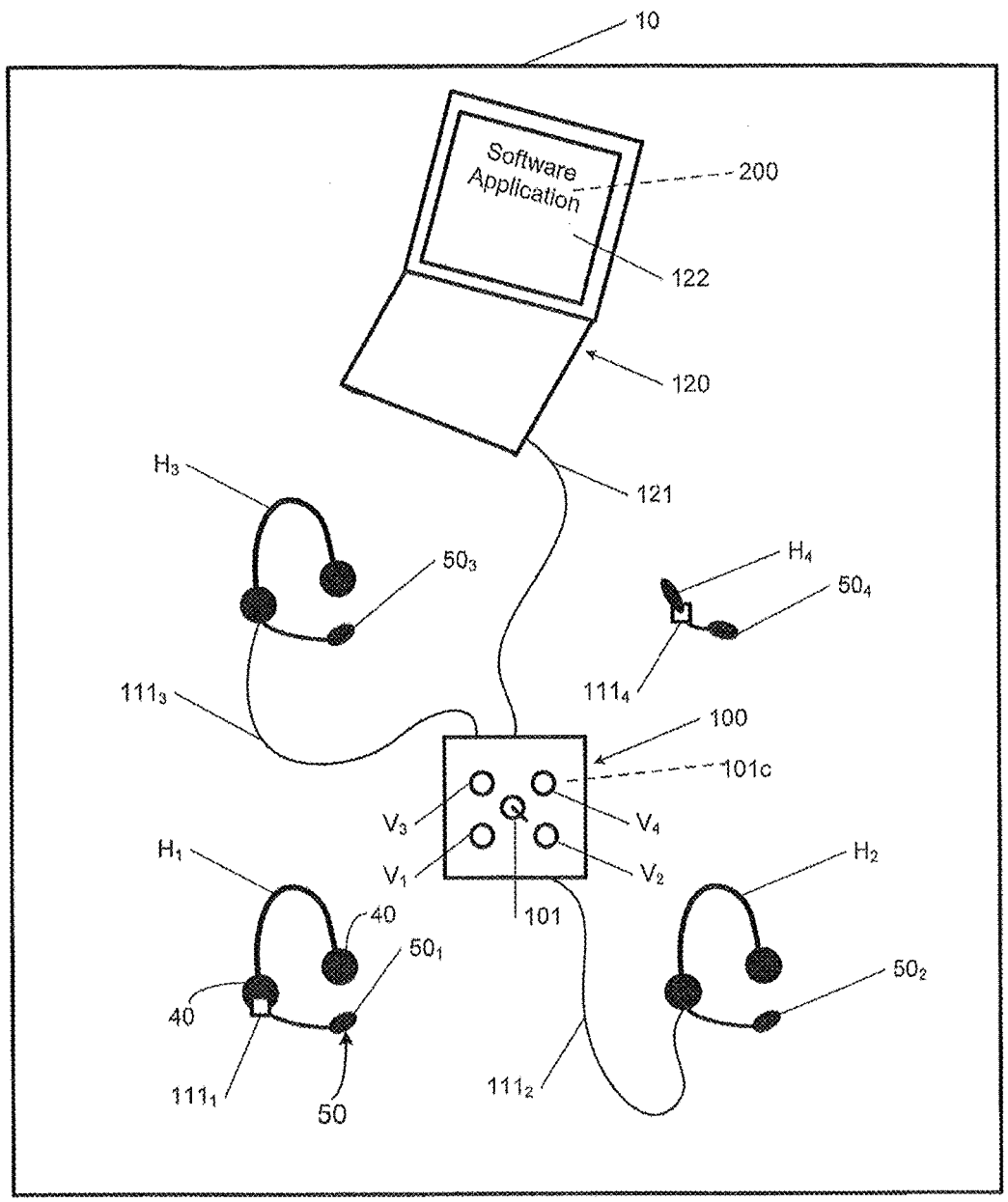

Although the first headset $H_1$ is illustrated in FIG. 1A as being connected to the multi-user portable electronic device 100 via a headset interface $111_1$ that includes a cable, one or more of the headsets $H_1$-$H_4$ may additionally or alternatively be configured to connect to the multi-user portable electronic device 100 via a headset interface 111 that includes a wireless interface such as Bluetooth, Wi-Fi, or the like. As an example, FIG. 1B illustrates that the headset interfaces $111_1$ and $111_4$ of the first and fourth headsets $H_1$ and $H_4$, respectively, are wireless interfaces, and that the headset interfaces $111_2$ and $111_3$ of the second and third headsets $H_2$ and $H_3$, respectively, are wired interfaces.

Moreover, although a headset H may be a single unit that includes a microphone 50 and one or two earphones 40, it will be understood that a subject's microphone 50 and earphone(s) 40 may be separate (e.g., discrete) devices. For example, a subject may wear an earphone 40 in/on/near his or her ear and speak into a microphone 50 that is not physically connected to the earphone 40. As an example, the microphone 50 may be included in the multi-user portable electronic device 100 or the electronic device 120 that includes the display 122. As another example, the microphone 50 may be a discrete microphone that the user holds in his or her hands or rests on a table or floor. In other embodiments, the headset H can be an ear-supported device (e.g., an in-the-ear device or an over/around-the-ear device rather than an over-the-head device or a behind-the-neck device), such as the fourth headset $H_4$ illustrated in FIG. 1B. As such, the term "headset" is used broadly herein to refer to all configurations that transmit the FAF signal to the respective user ear(s).

Figure 1C:
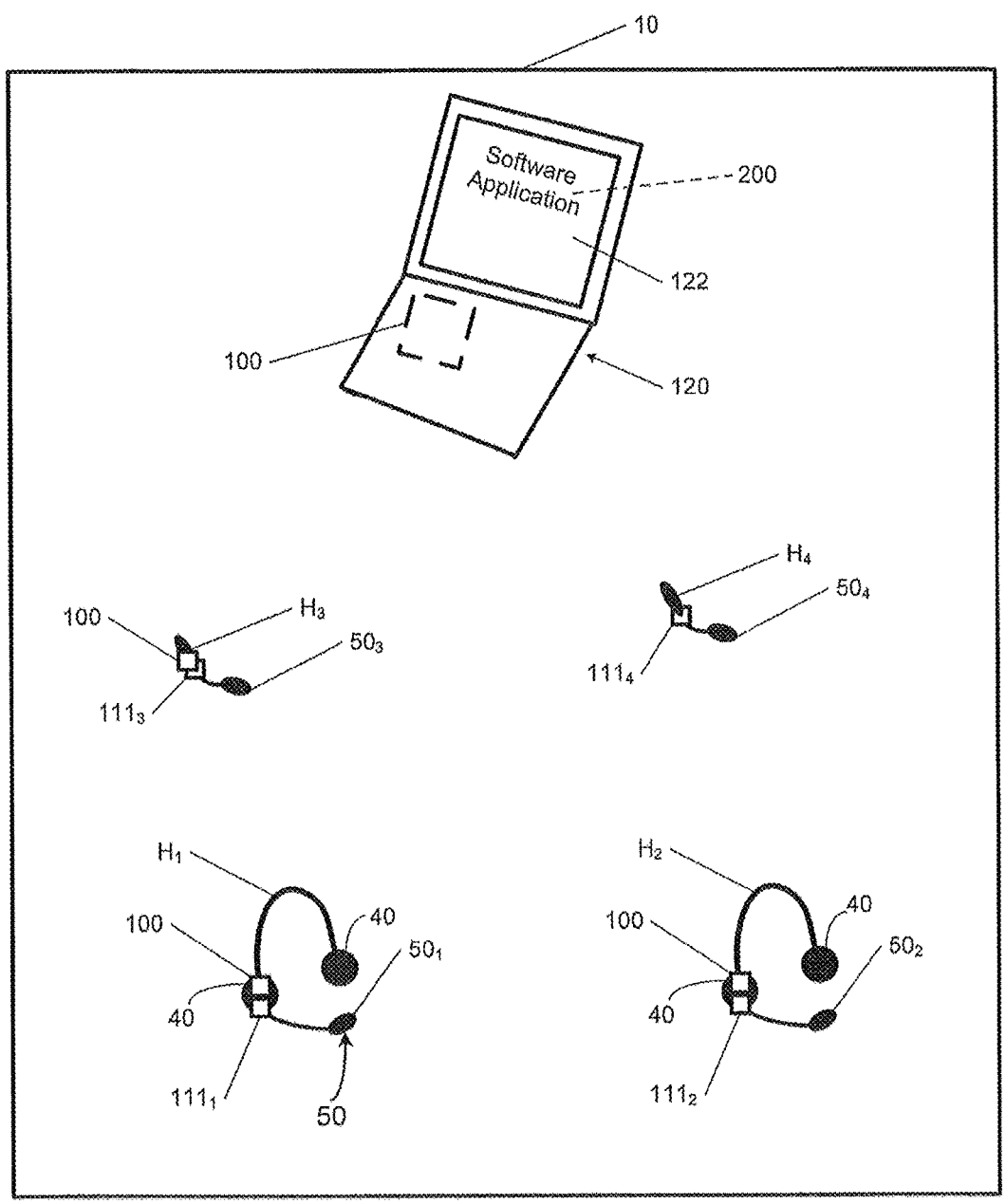

Referring now to FIG. 1C, the multi-user portable electronic device 100 may be integrated on/within one or more of the headsets $H_1$-$H_4$ and/or the electronic device 120. As an example, the headsets $H_1$-$H_4$ may be wireless headsets, and the first wireless headset $H_1$ may include the multi-user portable electronic device 100, which may generate/administer a FAF signal for/to the first wireless headset $H_1$ and/or the wireless headsets $H_2$-$H_4$. Additionally or alternatively, the electronic device 120 may include the multi-user portable electronic device 100, which may generate/administer a FAF signal for/to one or more of the headsets $H_1$-$H_4$ (either wirelessly or through a wired interface). Accordingly, in some embodiments, the multi-user portable electronic device 100 may be embodied in circuitry integrated on/within one or more of the headsets $H_1$-$H_4$ and/or the electronic device 120, rather than being a discrete device that is spaced apart from the headsets $H_1$-$H_4$ and the electronic device 120. Such embodiments may reduce the amount of space, circuitry, and/or wires used by a system for improving reading ability and/or comprehension for a plurality of subjects.

Figure 1D:
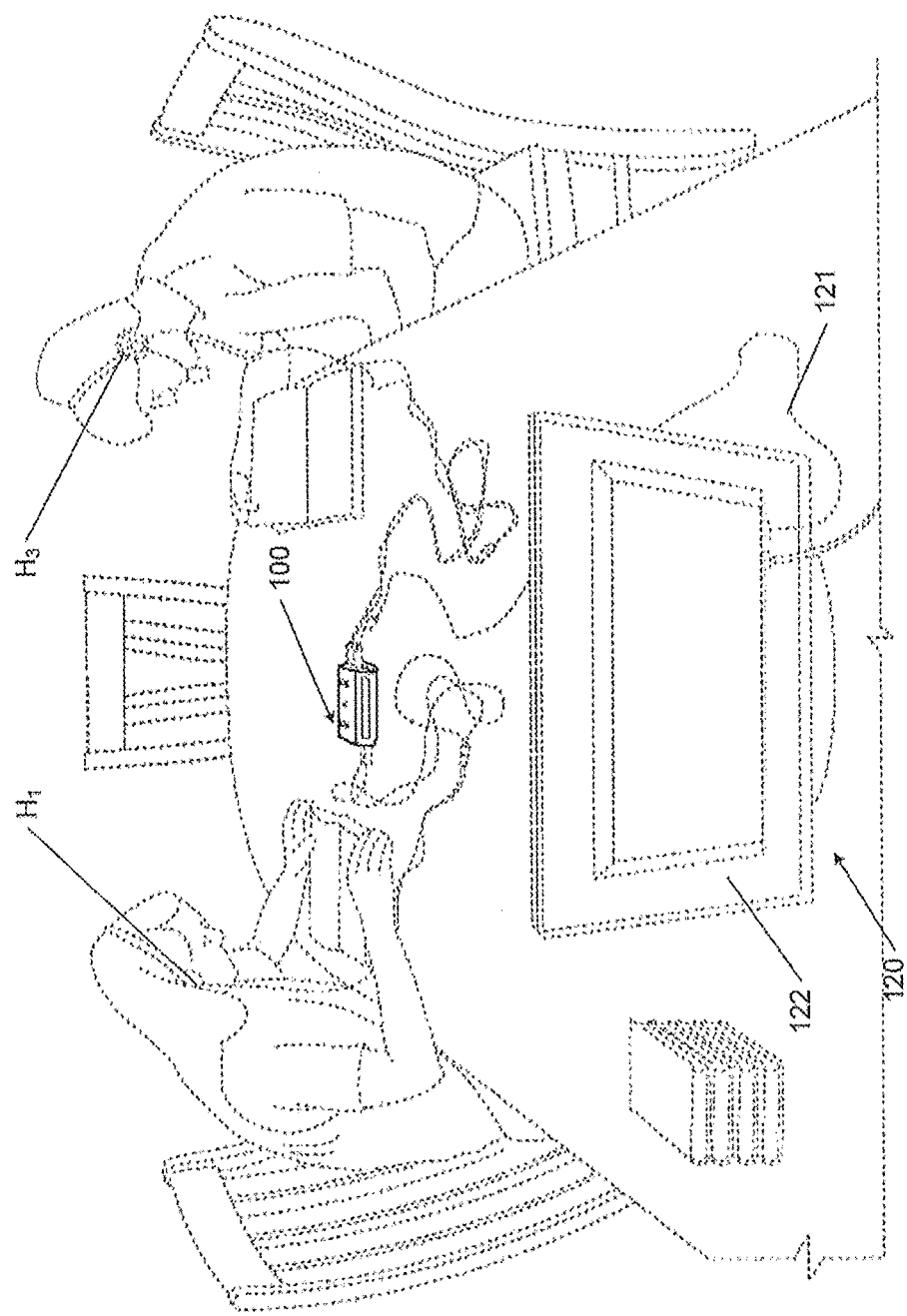
FIG. 1D is a top perspective view of a system for improving reading ability and/or comprehension for a plurality of subjects, according to various embodiments.

Referring now to FIG. 1D, two subjects are illustrated wearing the first and third headsets $H_1$ and $H_3$, respectively. As described herein, a plurality of subjects may take turns reading aloud using the multi-user portable electronic device 100 and the microphones 50 that are selectively, serially activated (e.g., one at a time). For example, the subject wearing the first headset $H_1$ may read aloud into the first microphone $50_1$ of the first headset $H_1$. The multi-user portable electronic device 100 may responsively administer a FAF signal generated using the speech signal associated with the first microphone $50_1$ to the first headset $H_1$ and/or the third headset $H_3$, and may thereby stimulate phonological processing brain mechanisms in one or both of the subjects.

Figure 1E:
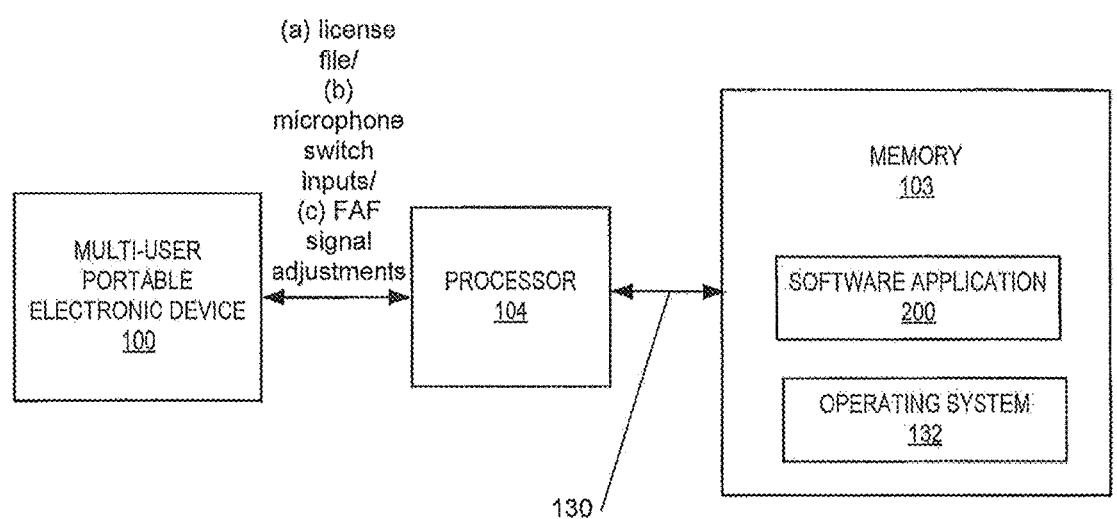
FIG. 1E is a block diagram that illustrates details of an exemplary processor and memory that may be used in accordance with embodiments of the present invention.

FIG. 1E is a block diagram that illustrates details of an exemplary processor 104 and memory 103 that may be used in accordance with embodiments of the present invention. Specifically, FIG. 1E illustrates an exemplary processor 104 and memory 103 of an electronic device 120, according to some embodiments of the present invention. The processor 104 communicates with the memory 103 via an address/data bus 130. The processor 104 may be, for example, a commercially available or custom microprocessor. Moreover, it will be understood that the processor 104 may include multiple processors. The memory 103 is representative of the overall hierarchy of memory devices containing the software and data used to implement various functions of the electronic device 120 as described herein. The memory 103 may include, but is not limited to, the following types of devices: cache, ROM, PROM, EPROM, EEPROM, flash, SRAM, and DRAM.

As shown in FIG. 1E, the memory 103 may hold various categories of software and data, such as an operating system 132 and/or a software application 200. The operating system 132 controls operations of the electronic device 120. In particular, the operating system 132 may manage the resources of the electronic device 120 and may coordinate execution of various programs (e.g., the software application 200) by the processor 104.

B. FAF Signals

According to various embodiments of the present invention, a multi-user portable electronic device 100 described herein may administer (e.g., generate and/or deliver) a FAF signal to one or more subjects corresponding to the headsets $H_1$-$H_4$. In particular, a FAF signal may be delivered to a subject, proximate in time to when the subject is talking or speaking, to improve the subject's reading ability and/or comprehension. The terms "talking" and "speaking" are used interchangeably herein and include verbal expressions of voice, whether talking, speaking, whispering, singing, yelling, and whether to others or to oneself In some embodiments, improving the subject's reading ability and/or comprehension may include reducing a reading disorder (e.g., disability or impairment) of the subject.

For example, a reading disorder may be diagnosed by standardized tests that establish that an individual subject is below an age level reading expectation, such as, but not limited to, the Stanford Diagnostic Reading Test. (See Carlson et al., *Stanford Diagnostic Reading Test* (NY, Harcourt Brace Javanovich, 1976).) A reading disorder may also be indicated by a comparison to the average ability of individuals of similar age. Moreover, a relative decline in a subject's own reading ability and/or comprehension may be used to establish the presence of a reading disorder.

A subject to be treated with the multi-user portable electronic device 100 may be a child with a reduced reading ability and/or comprehension relative to an age level reading expectation based on a standardized diagnostic test. The child may be of pre-school age and/or primary/elementary/middle school age (e.g., grades K-8). Alternatively, a subject may be a teenager and/or high school student, an adult (e.g., of university student age or older), or an elderly person such as a senior citizen (e.g., greater than age 55, and typically greater than about age 62).

In some embodiments, a FAF signal may be provided by digital signal processing technology that provides programmably selectable operating parameters that can be customized to the needs of a subject and adjusted at desired intervals such as monthly, quarterly, annually, and the like, typically by a clinician, physician, or other user evaluating the subject. For example, referring now to FIG. 1F, programmably selectable and/or adjustable operating parameters may include +/− shifts in FAF (typically in about 500 Hertz (Hz)-200 Hz increments), linear gain control (such as about four 5-decibel (dB) step size increments), independent or individually adjustable "n" band gain controls (where n can be between about 2-20 bands with center frequencies ranging from 250-7000 Hz with 20 dB gain control settings).

Figure 1F:
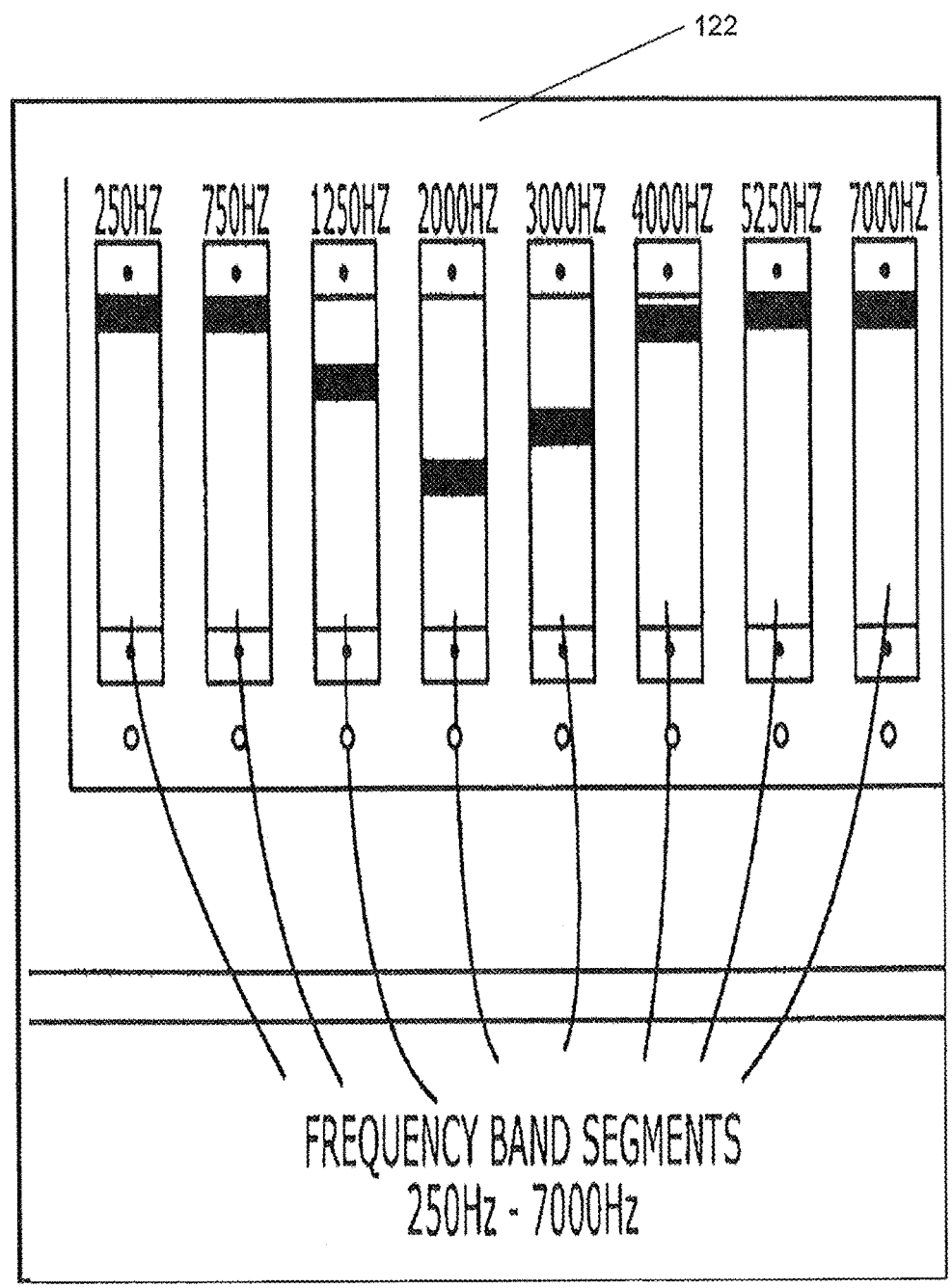
FIGS. 1F-1H are block diagrams that illustrate displays of electronic devices of the systems of any or all of FIGS. 1A-1D, according to various embodiments.

As illustrated in FIG. 1F, FAF signals may be adjustable via the electronic device 120 by selecting a desired frequency displayed on the display 122. The frequency adjustment can be adjustable by desired Hertz increments and decrements and may be shifted up or down, or turned off. Octave adjustments may alternatively be generated and selectable. It will be understood, however, that in some embodiments, adjustment of FAF signals by an end user of the electronic device 120 may be limited/prevented. For example, adjustment of FAF signals may be performed responsive to pre-programmed functions/algorithms and/or subsequently installed updates of the software application 200 rather than by GUI-based adjustments by an end user of the electronic device 120.

Figure 1G:
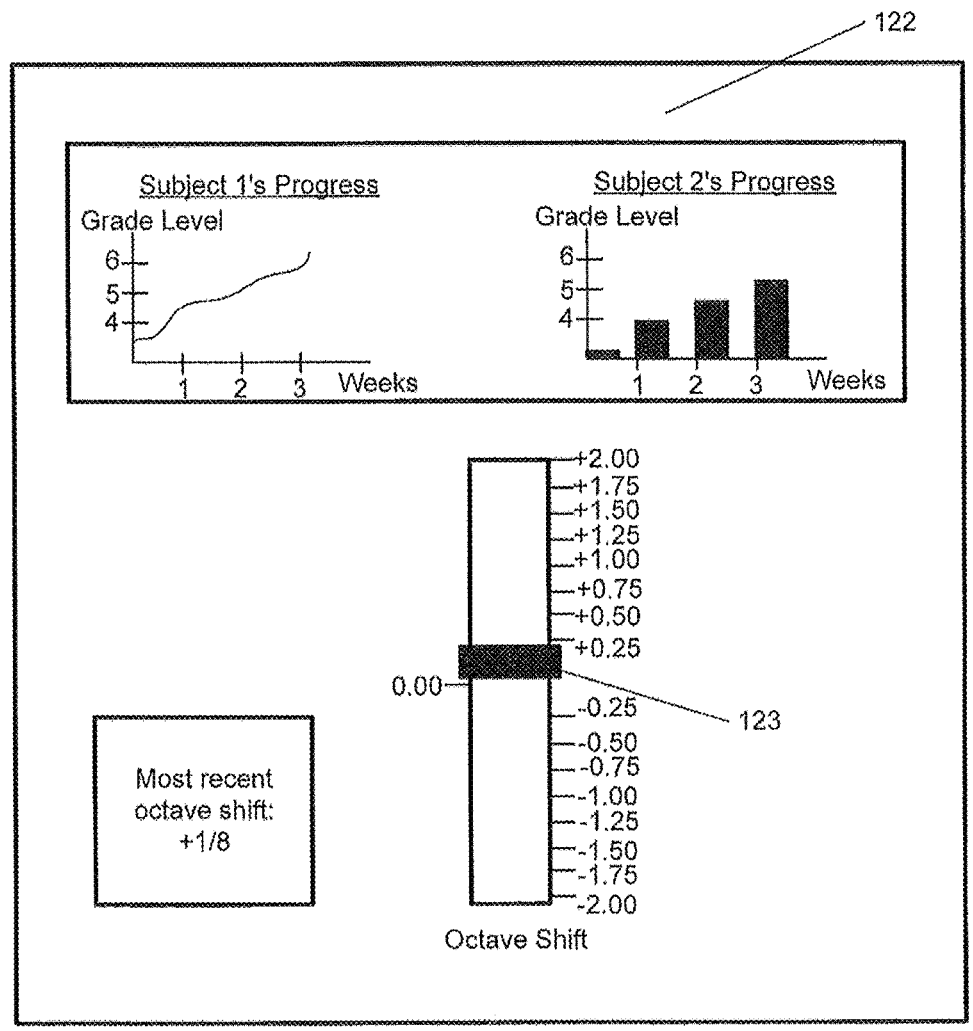

Referring now to FIG. 1G, a FAF frequency shift or adjustment can be any desired shift, but is typically within about +/−2 octaves from the frequency of the detected auditory speech signal of a subject. In some embodiments, the frequency may be adjusted at least about +/−⅛ of an octave, and typically the frequency can be adjusted at least about +/−¼ of an octave from the detected auditory signal. According to some embodiments, the FAF signal can be adjusted so as to provide a frequency shift of at least about +/−½ of an octave. Alternatively, the frequency shift may be about +/−¾ to 1 octave. Other shifts, or multiples thereof, and/or different increments of octave shift, may be employed.

Moreover, it will be understood that a user may programmably adjust a frequency/octave shift as described herein using the electronic device 120 that includes the display 122. For example, the user may move a slider 123 of a GUI presented by the display 122 to produce a desired octave shift. In another example, the user may type or speak a number corresponding to the desired octave shift, or may touch/click on a button within a GUI presented by the display 122 corresponding to the desired octave shift. Although the user may select a precise amount of octave shift in some embodiments, the user may in other embodiments simply choose to increase or decrease the octave shift without explicitly selecting the amount of shift.

A frequency shift, measured in Hertz, will typically be dependent upon the input signal. For example, for a 500 Hz input signal, a one octave shift is about 1000 Hz. Similarly, a one octave shift of a 1000 Hz input signal is about 2000 Hz. The adjustment may be customized based on one or more of the particular reading disorder of the subject and/or the subject's response to a plurality of different "test" FAF settings during a set-up evaluation. Moreover, the frequency adjustment may be altered over time upon periodic evaluations. Additionally or alternatively, the frequency adjustment may be set to be automatically adjusted in frequency shift increments and/or decrements at desired intervals or upon a trigger from a user using the electronic device 120.

Figure 1H:
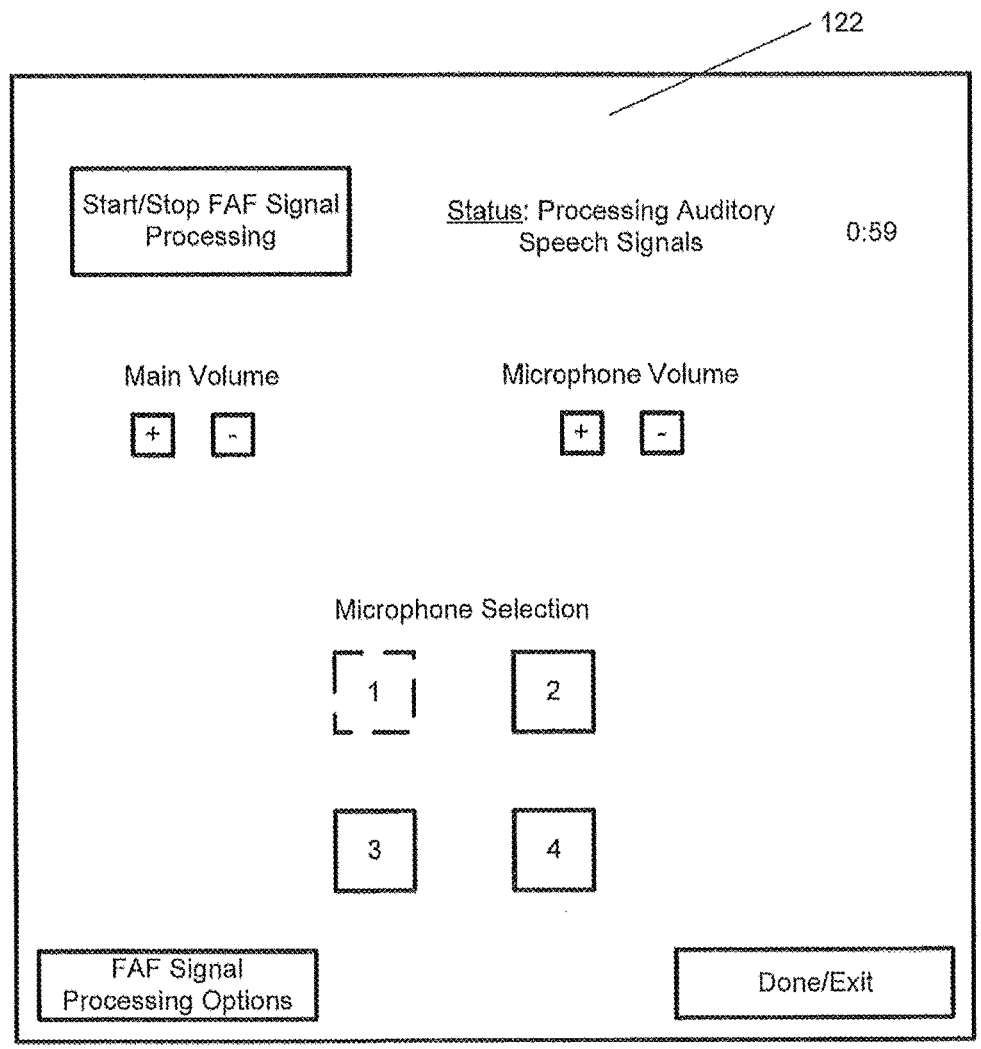

As illustrated in FIG. 1H, a user may select among the different microphones $50_1$-$50_4$ by using the electronic device 120 that includes the display 122. For example, the first microphone $50_1$ is indicated in FIG. 1H by the broken line around the number "1" on the display 122 as being the currently-selected microphone. The user may switch to receiving auditory speech signals from a different one of the microphones $50_1$-$50_4$, however, by selecting a different one of the corresponding numbers 1-4 via a GUI of the electronic device 120.

FIG. 1H further illustrates that a GUI of the electronic device 120 may additionally or alternatively include a start and/or stop button that controls starting and/or stopping of processing of auditory speech signals by the multi-user portable electronic device 100 and/or the electronic device 120. In other words, the start/stop button(s) may control receipt of the auditory speech signals from the microphones $50_1$-$50_4$ and/or responsive generation of FAF signals. In some embodiments, the GUI may illustrate a status (e.g., "processing auditory speech signals," "idle," "stopped," "processing completed," etc.) of the multi-user portable electronic device 100. The status may optionally include an indication of how long (e.g., 59 seconds) that particular status has been ongoing.

Referring still to FIG. 1H, a GUI of the electronic device 120 may include main volume controls (e.g., to adjust a volume level of a FAF signal provided to one or more of the headsets $H_1$-$H_4$) and/or microphone volume controls (e.g., to adjust a volume level of an auditory speech signal received from a microphone 50). Moreover, in some embodiments, a GUI of the electronic device 120 may include a FAF Signal Processing Options button, which may control access to signal processing options/controls such as those illustrated in FIGS. 1F and/or 1G. Alternatively, the signal processing options/controls may be included on the same screen/menu as one or more of the features illustrated in FIG. 1H. Furthermore, FIG. 1H illustrates a Finish/Done/Exit button that closes/minimizes the software application 200 that is being executed on the electronic device 120.

C. Circuitry of the Multi-User Portable Electronic Device 100

Figure 2A:
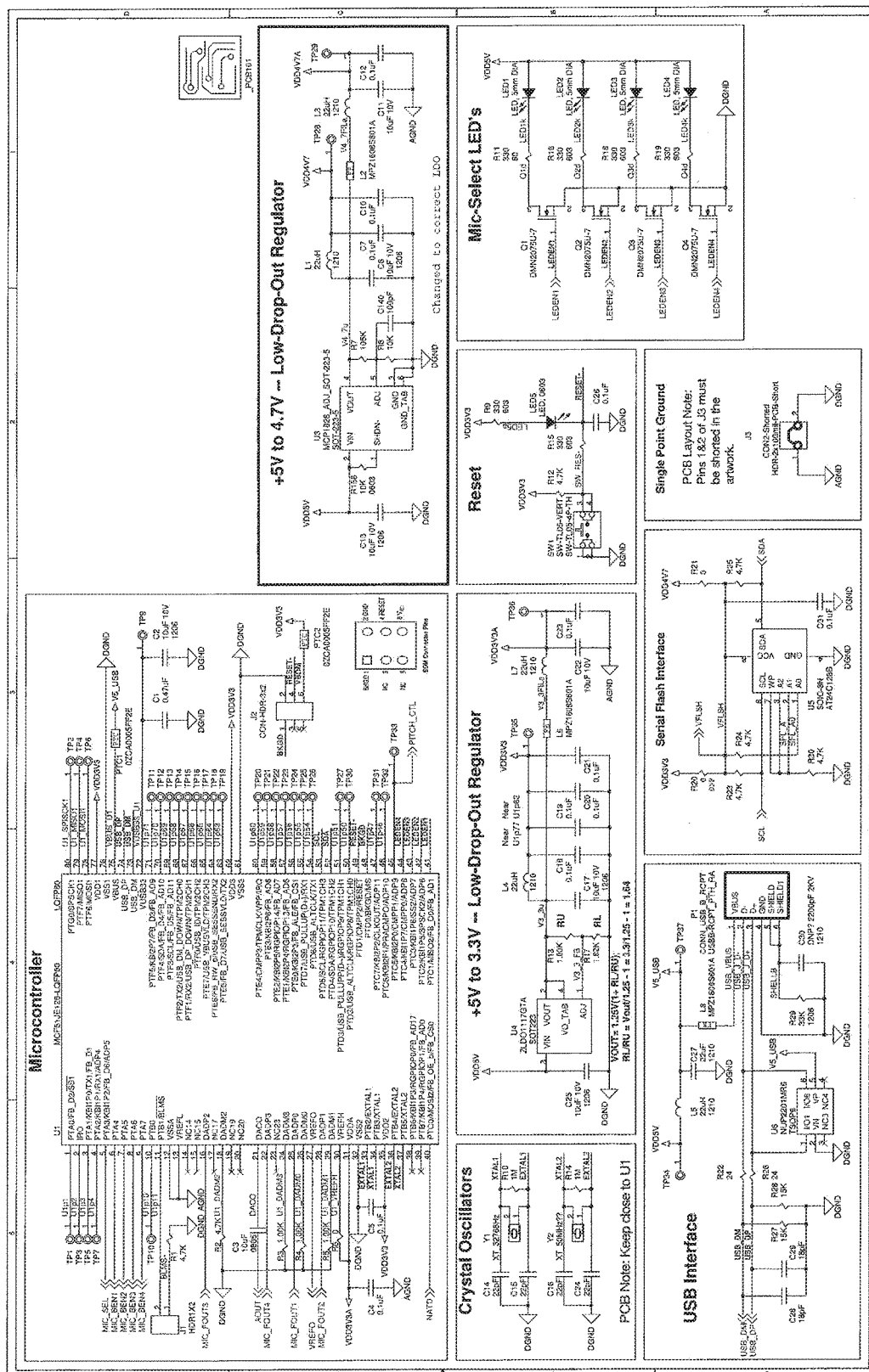
FIGS. 2A-2D are schematic diagrams illustrating examples of circuitry of a multi-user portable electronic device of the systems of any or all of FIGS. 1A-1D, according to various embodiments.
Figure 2B:
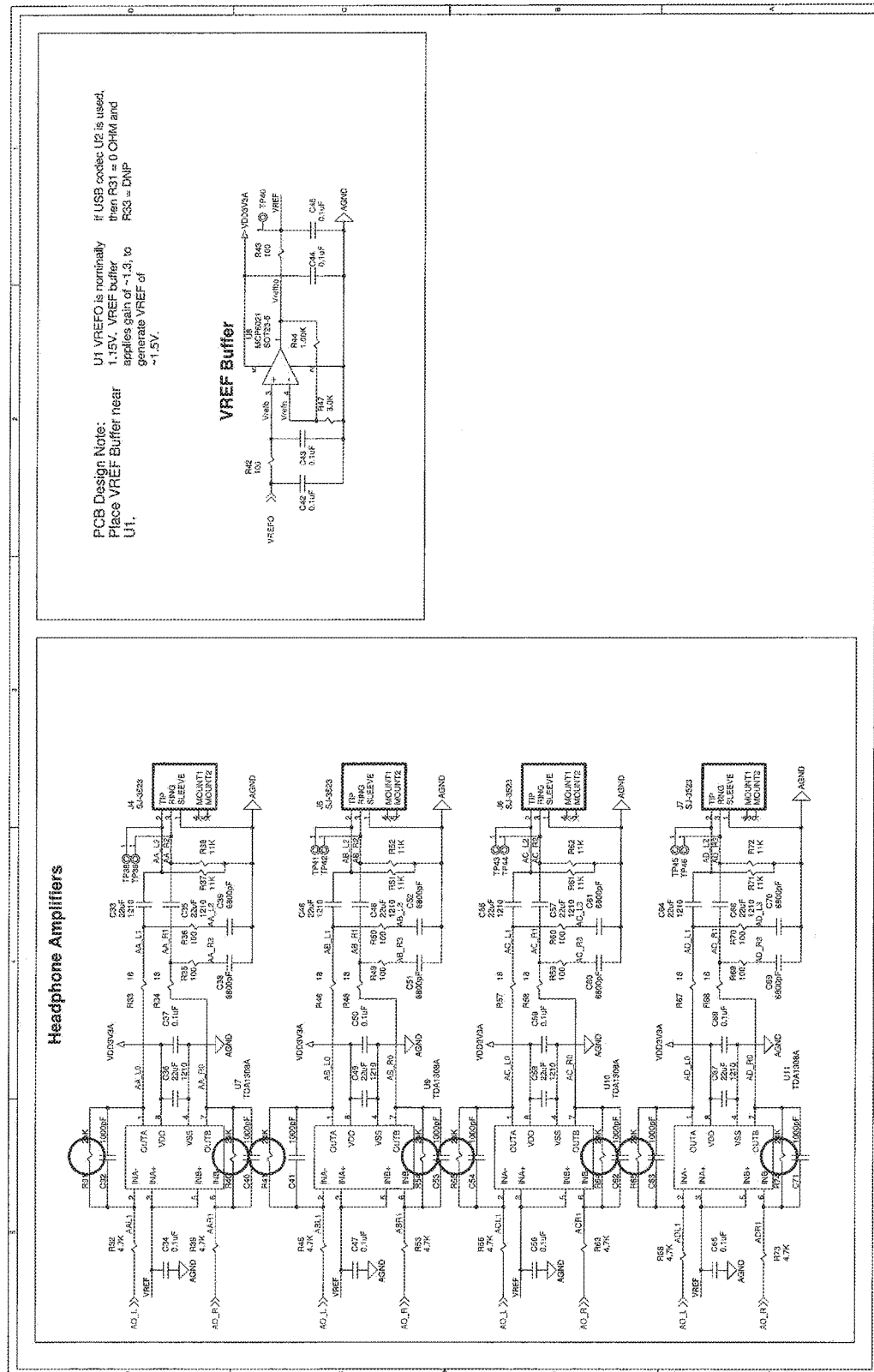
Figure 2C:
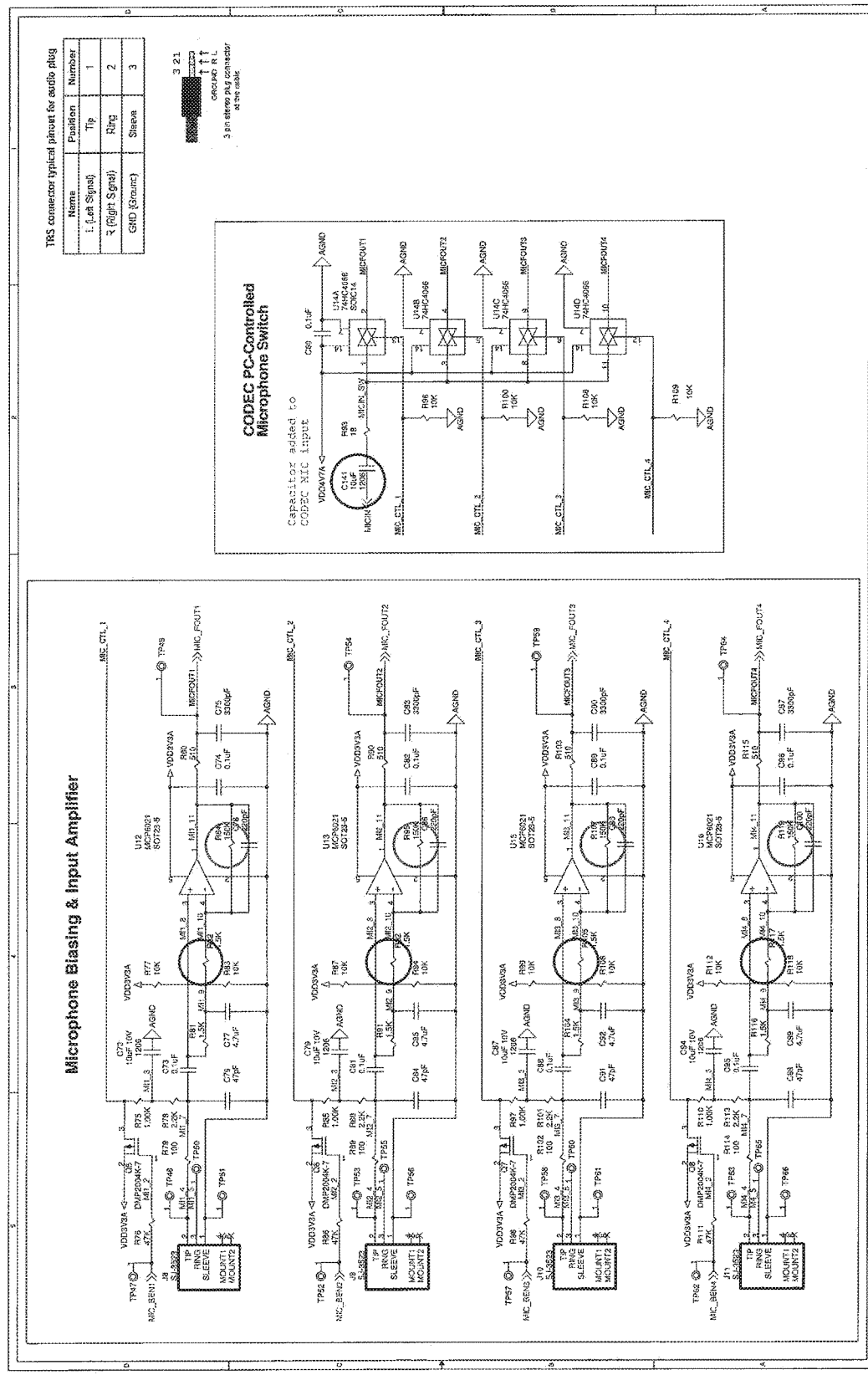

Examples of circuitry of the multi-user portable electronic device 100 are illustrated in FIGS. 2A-2D. For example, the multi-user portable electronic device 100 may include circuitry configured to receive an auditory speech signal generated by a subject's speech. In one example, the multi-user portable electronic device 100 may include an on-board microphone biasing and input amplifier circuit (e.g., as illustrated in FIG. 2C) that is configured to process auditory speech signals received from the headsets $H_1$-$H_4$. Moreover, the auditory speech signal may be an analog input signal of sound produced by a microphone of a headset H. An Analog-to-Digital converter of the multi-user portable electronic device 100 may then convert the analog input signal into a digital input signal.

Figure 2D:
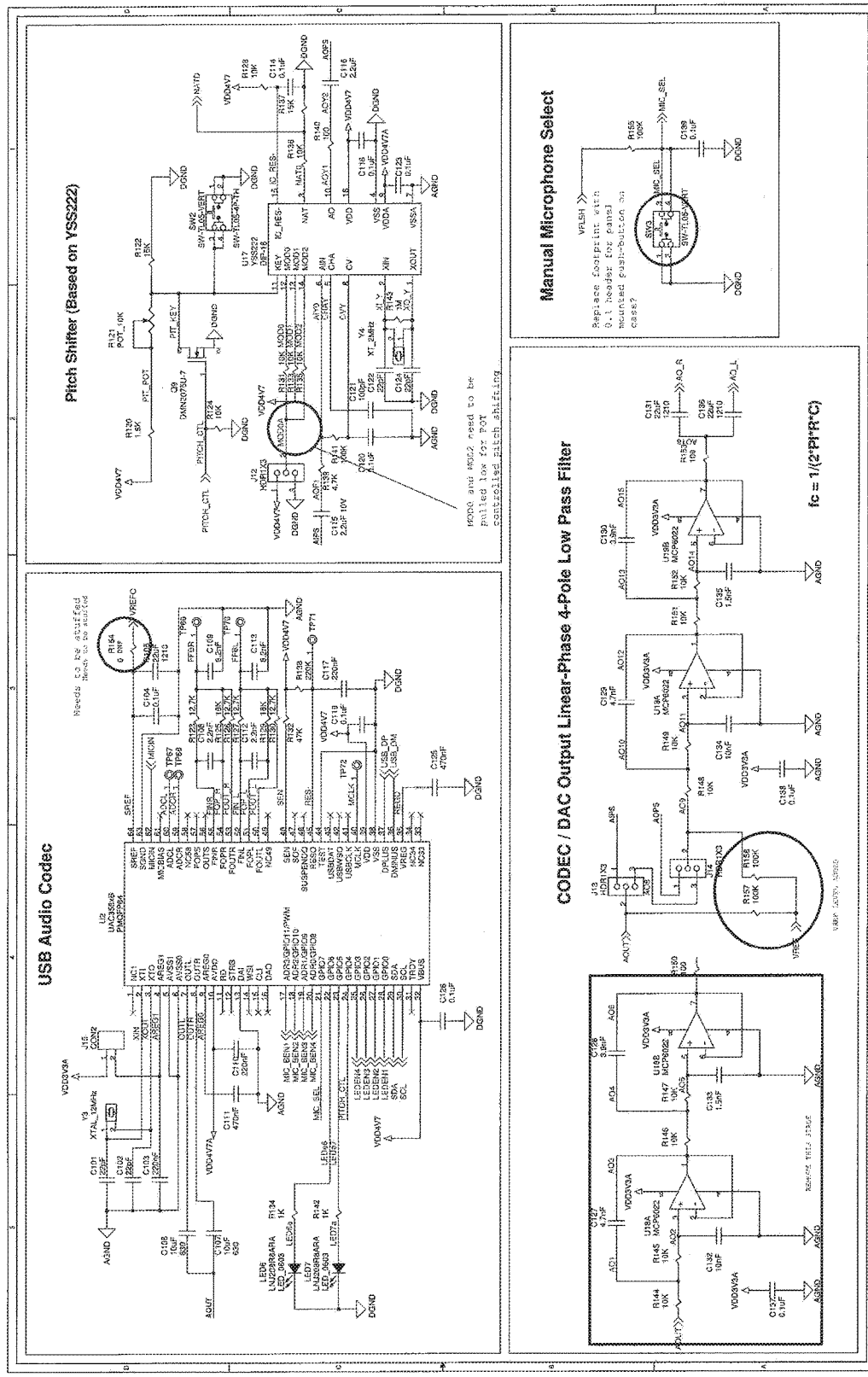

The multi-user portable electronic device 100 may include a pitch shifter circuit (e.g., as illustrated in FIG. 2D) that receives the digital signal. The pitch shifter circuit may be configured to generate a FAF signal and to provide the FAF signal as an output that may then be fed into a Digital-to-Analog (D/A) converter. The analog signal output from the D/A converter may then be passed through a low pass filter (e.g., as illustrated in FIG. 2D) to accurately reproduce the FAF of the original signal. The earphone(s) 40 of the headset H may then recreate a FAF version of the subject's spoken words. Moreover, before a signal is transmitted from the multi-user portable device electronic device 100 to the headsets $H_1$-$H_4$, the output of the low pass filter may be fed into an adjustable gain amplifier (e.g., as illustrated in FIG. 2B) to allow a user using the electronic device 120 including the display 122 to adjust the output volume of the signal. In some embodiments, the adjustable gain amplifier may include on-board headphone amplifier circuits corresponding to respective headsets $H_1$-$H_4$.

D. Software Application 200 of the Electronic Device 120 that Includes the Display 122

The electronic device 120 that includes the display 122 may include the software application 200, which may manage/control the multi-user portable electronic device 100. The software application 200 may be stored in a non-transitory memory of the electronic device 120. Additionally or alternatively, the software application 200 may be accessed via a network interface of the electronic device 120. The software application 200 may be configured to start/open in response to the electronic device 120 detecting that the multi-user portable electronic device 100 is connected to the electronic device 120.

Referring back to FIG. 1H, the software application 200 may include a GUI that allows a user using the electronic device 120 to start and/or stop processing of the auditory speech signals, and/or to adjust volume levels of the auditory speech signals and/or the FAF signals. The software application 200 may additionally or alternatively provide programmable selection and/or adjustment of the FAF signals. Moreover, referring back to FIG. 1G, the software application 200 may track (e.g., using data capture features) the FAF signals and generate charts and/or graphs on the display 122 to illustrate the reading ability and/or comprehension progress of one or more of the plurality of subjects. For example, FIG. 1G illustrates that the display 122 may indicate the most recent FAF signal octave shift and/or a graph of one subject's (e.g., a first subject's) reading ability and/or comprehension progress and/or a chart of another subject's (e.g., a second subject's) reading ability and/or comprehension progress.

In some embodiments, the multi-user portable electronic device 100 may include a non-volatile memory, which may store a license file that is specific to the multi-user portable electronic device 100 and/or the software application 200. The license file may be any file/key that is necessary for the multi-user portable electronic device 100 and/or the software application 200 to generate FAF signals. Accordingly, the multi-user portable electronic device 100 may be fully functional only in response to cooperation between the software application 200 and the license file. For example, the license file may correspond to a license/subscription that expires after a particular date or time period (e.g., 6 months or 1 year, etc.), such that the multi-user portable electronic device 100 may be fully functional only before the license/subscription expires. The license file may include a password or code. Additionally or alternatively, accessing the license file may require a user to provide a password or code. In some embodiments, the license file can be remotely accessed to activate/deactivate the multi-user portable electronic device 100 and/or the software application 200.

Using the license file with the multi-user portable electronic device 100 as described herein may help to protect against misuse (e.g., unauthorized use) of the software application 200 and/or the multi-user portable electronic device 100. In other words, the software application 200 may be fully functional only in combination with a valid license/subscription of the multi-user portable electronic device 100 and/or the software application 200. Moreover, it will be understood that more than one license file may be stored in the multi-user portable electronic device 100.

Referring back to FIG. 1E, the software application 200 may receive (a) the license file and/or (b) microphone switch inputs (e.g., signals indicating that a user has switched between the microphones 50 using the switch 101) from the multi-user portable electronic device 100 via the processor 104 of the electronic device 120. Additionally or alternatively, the processor 104 may transmit (c) FAF signals that have been adjusted using the software application 200, and/or (b) microphone switch inputs corresponding to a user's switching between the microphones 50 using the software application 200, to the multi-user portable electronic device 100.

The following are examples of installing/starting the software application 200, along with examples of connecting headsets (which may be the headsets $H_1$-$H_4$) and a computer (which may be the electronic device 120 having the display 122) to the multi-user portable electronic device 100. Although a Compact Disc (CD) is described, it will be understood that the software application 200 may be downloaded via the Internet or a local network, or installed from a flash drive or other media.

i. Software Application 200 Installation

The software application 200 needs to be installed before hardware (e.g., the multi-user portable electronic device 100) is connected to the electronic device 120. Close all other applications and insert the CD in the electronic device 120's CD/DVD drive. The installation process should begin automatically. If not, locate the files on the installation disk (e.g., using Windows Explorer) and click on setup.exe. Be sure to select the folder that has your computer operating system (e.g., Windows XP, Windows 7 , or an Apple or Linux/Unix operating system).

ii. Connecting Headsets H to the Multi-User Portable Electronic Device 100

Figure 4A:
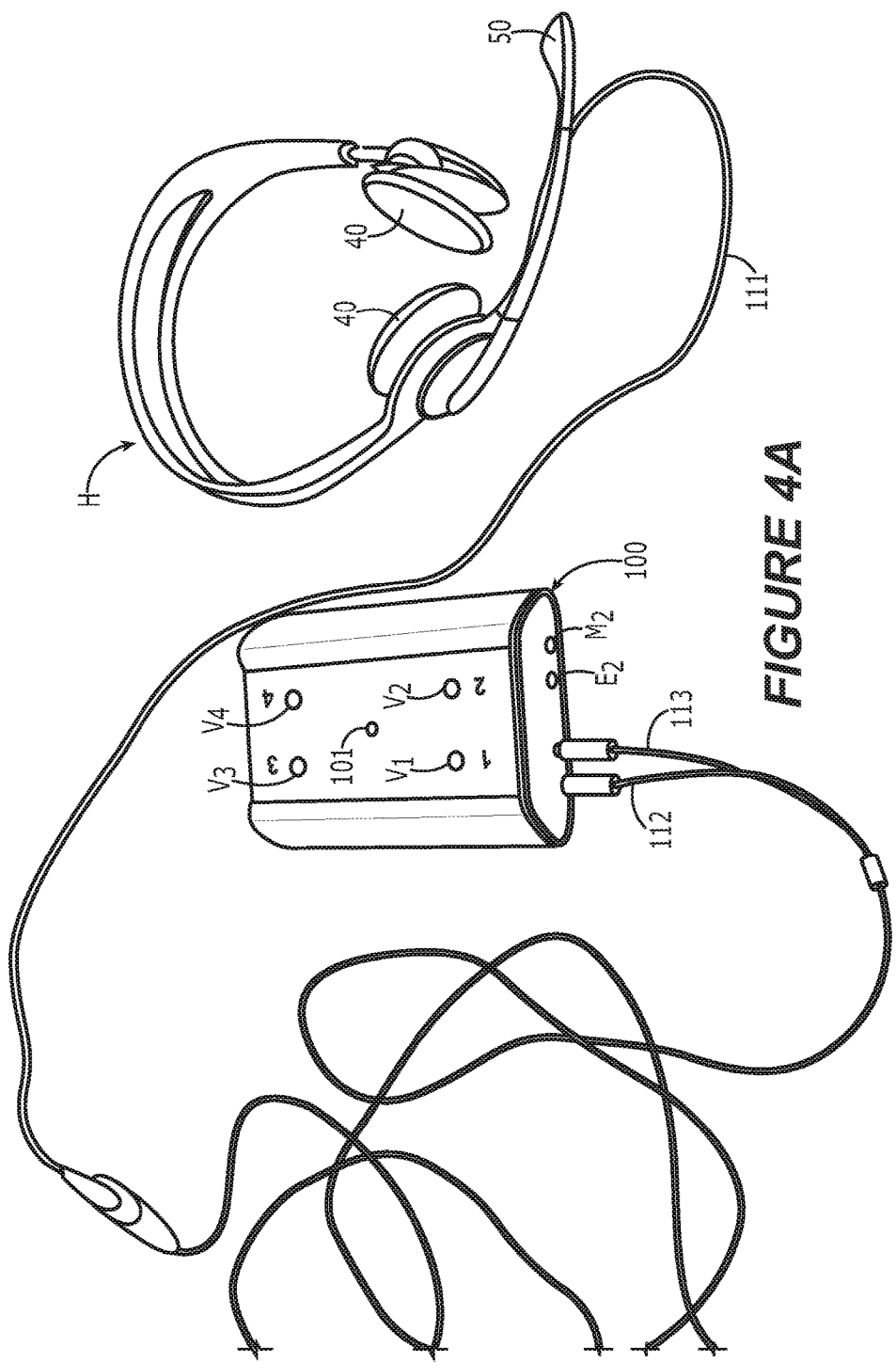
FIGS. 4A-4D provide images of different views/angles of a multi-user portable electronic device, according to various embodiments. In particular.

The headset package includes the headset H and two accessory cables 112, 113 (e.g., as illustrated in FIG. 4A). You will only need the set with the green and pink connectors. Plug the headsets H into the multi-user portable electronic device 100 using the adaptor with the green and pink connectors.

iii. Connecting the Multi-User Portable Electronic Device 100 to the Electronic Device 120

The multi-user portable electronic device 100 is now ready to plug into a USB port 121 on the electronic device 120. A display window should appear telling you that the electronic device 120 has found a new device. The front panel of the multi-user portable electronic device 100 has four LEDs $V_1$-$V_4$ and one push button 101. By pushing and releasing the button 101 the LEDs $V_1$-$V_4$ will light up sequentially. When an LED V is on, it's indicating which of the four microphones $50_1$-$50_4$ is active.

iv. Starting the Software Application 200

The software application 200 will not open if the hardware (e.g., the multi-user portable electronic device 100) is not connected to the electronic device 120. Once the software application 200 is open, you will see a play/stop (or start/stop) button, main volume and microphone volume controls, and a finish or "done" button. The play/stop button starts and stops the processing. The main volume and microphone volume controls adjust the audio levels. The "done" button exits the program. You cannot exit while the software application 200 is processing. The play/stop button must indicate "stop."

E. Operations for Improving Reading Comprehension for a Plurality Of Subjects

Figure 3A:
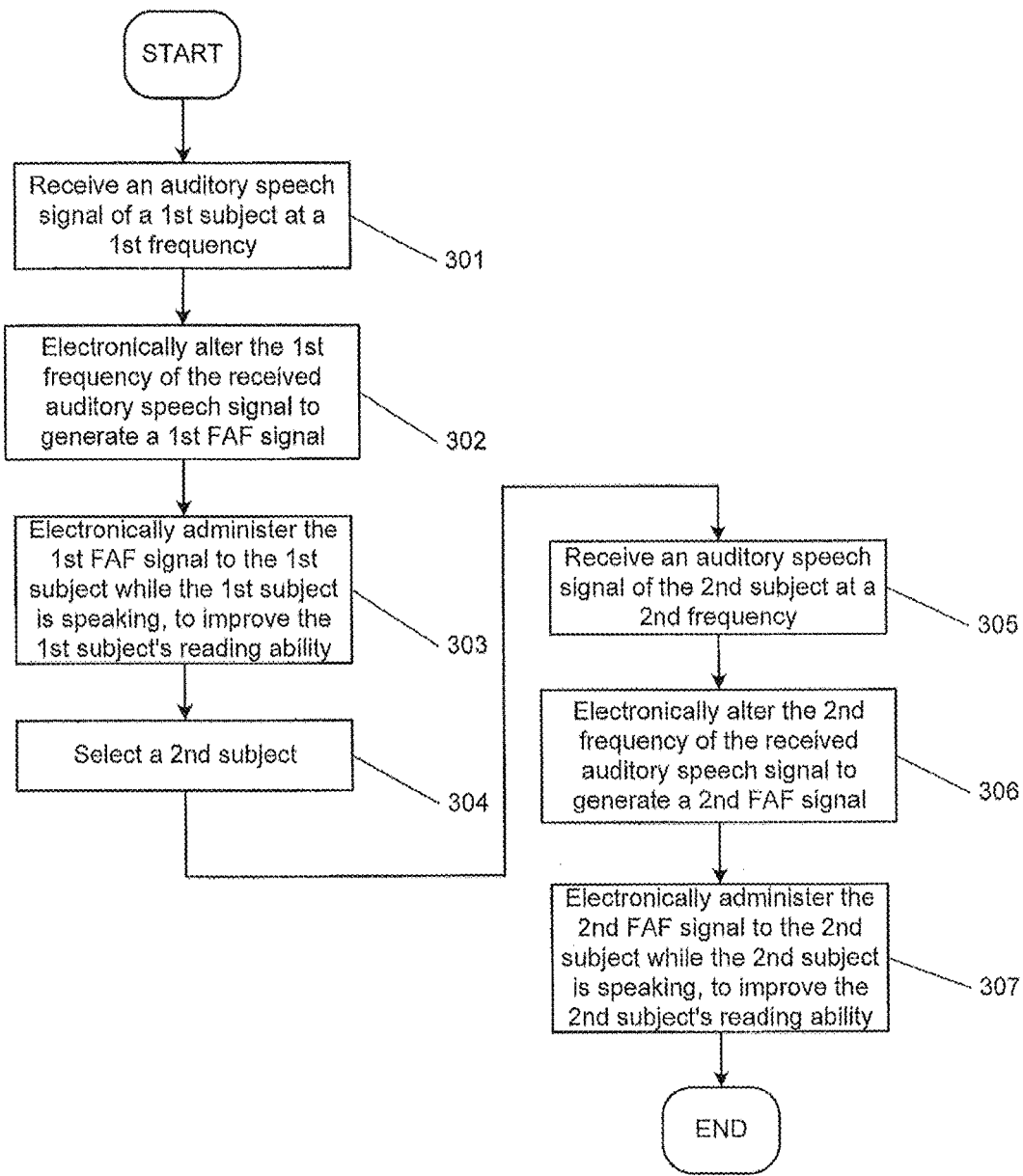
FIG. 3A-3C are flowcharts illustrating exemplary operations of reading improvement systems, according to various embodiments.
Figure 3B:
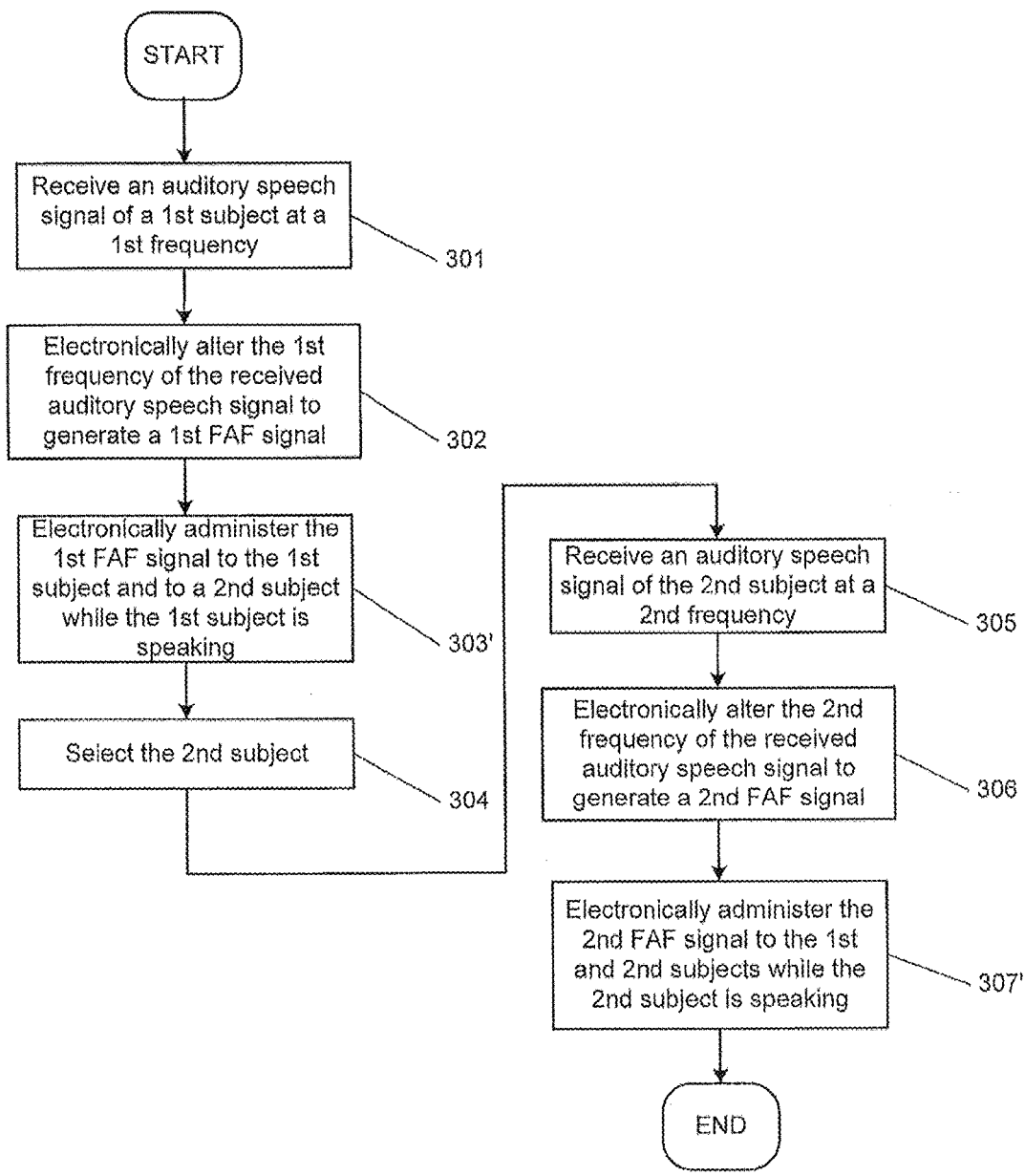
Figure 3C:
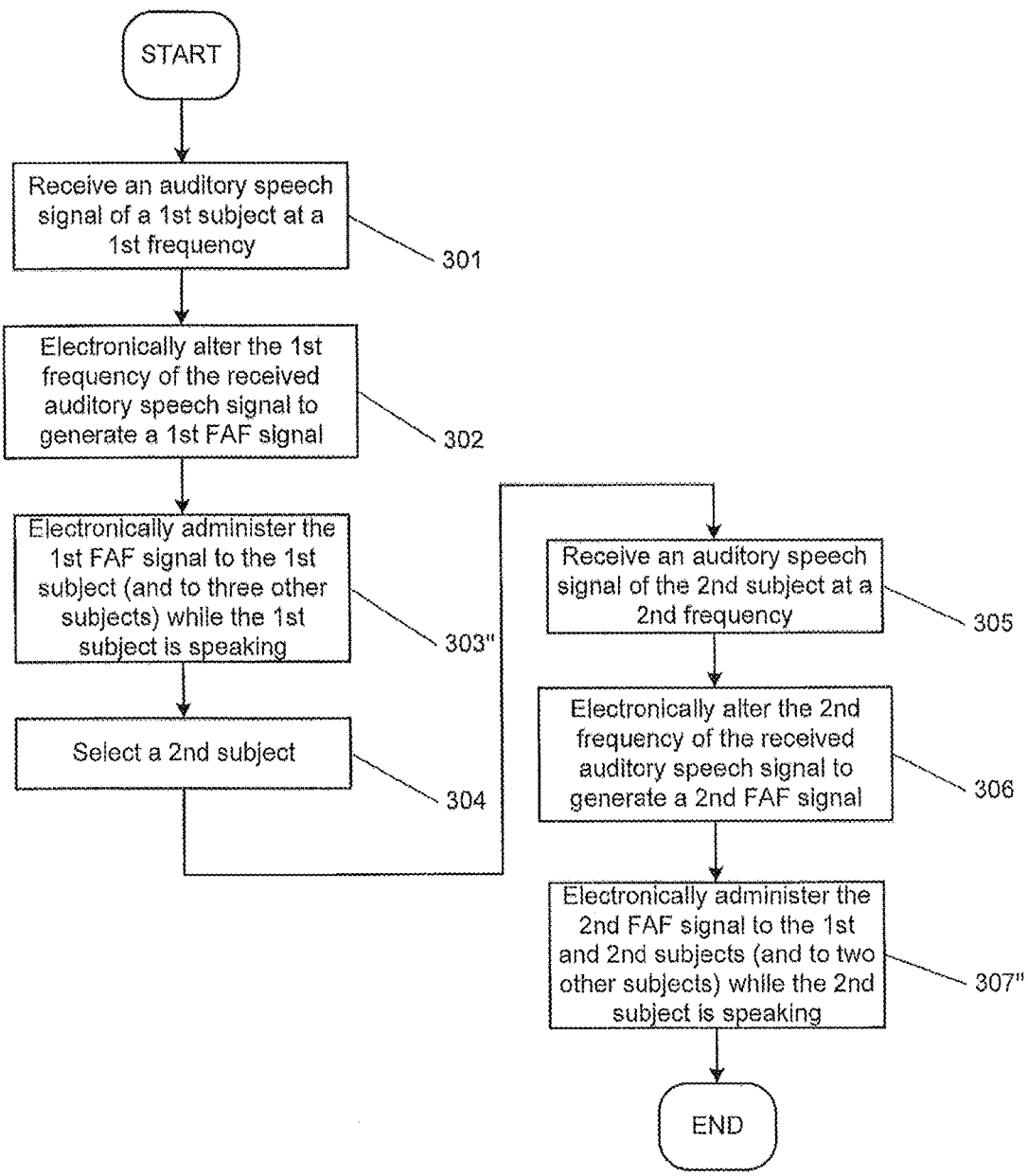

FIGS. 3A-3C provide flowcharts illustrating operations (e.g., methods, processes, etc.) for improving reading ability and/or comprehension for a plurality of subjects. Referring now to FIG. 3A, the operations may include receiving, at the multi-user portable electronic device 100, an auditory speech signal of a first subject at a first frequency (Block 301). For example, the first subject may be a person wearing a first headset $H_1$ and may speak into a microphone $50_1$ of the first headset $H_1$ to generate the auditory speech signal. The multi-user portable electronic device 100 (e.g., using its pitch shifter circuit) and/or the electronic device 120 including the display 122 may then electronically alter the first frequency of the received auditory speech signal to generate a first FAF signal (Block 302). The multi-user portable electronic device 100 may electronically administer the first FAF signal to the first subject while the first subject is speaking, and doing so may improve the first subject's reading ability and/or comprehension (Block 303). It is contemplated that a FAF signal may stimulate central mechanisms in a subject's brain responsible for phonological processing, and such stimulation may improve the subject's reading ability and/or comprehension. Specifically, a FAF signal may allow a subject to hear his or her voice with a shift in pitch/frequency while reading.

After the multi-user portable electronic device 100 electronically administers the first FAF signal to the first subject, a user using the electronic device 120 and/or the display 122 may select a second subject to speak (Block 304). For example, the user may manually operate the switch 101, or may use an application displayed on the display 122 of the electronic device 120, to activate a microphone $50_2$ of the second headset $H_2$ worn by the second subject. After the microphone $50_2$ of the second subject is activated, the multi-user portable electronic device 100 receives an auditory speech signal of the second subject at a second frequency (Block 305). The second frequency may be different from the first frequency of the first subject's auditory speech signal. The multi-user portable electronic device 100 and/or the electronic device 120 including the display 122 then electronically alters the second frequency of the received auditory speech signal to generate a second FAF signal (Block 306). Next, the multi-user portable electronic device 100 may electronically administer the second FAF signal to the second subject while the second subject is speaking, which may improve the second subject's reading ability and/or comprehension (Block 307). In other words, each of the first and second subjects may have a reading disorder, and administering the FAF signals may provide therapeutic treatment to improve the first and second subjects' reading abilities.

Referring now to FIG. 3B, FIG. 3B includes Blocks 301, 302, and 304-306 of FIG. 3A, and further includes Blocks 303' and 307', which are modifications of Blocks 303 and 307 of FIG. 3A, respectively. In particular, FIG. 3B illustrates that, in some embodiments, each of the subjects connected to the multi-user portable electronic device 100 may receive each FAF signal, even FAF signals corresponding to auditory speech signals generated by other subjects. For example, electronically administering the first FAF signal may include concurrently electronically administering the first FAF signal to both of the first and second subjects while the first subject is speaking (Block 303'). In other words, the first subject wearing the first headset $H_1$ and second subject wearing the second headset $H_2$ may each hear the same FAF signal substantially simultaneously. Electronically administering the first FAF signal to both of the first and second subjects may stimulate phonological processing brain mechanisms in both of the first and second subjects, and may thus improve both the first subject's reading ability and/or comprehension and the second subject's reading ability and/or comprehension.

Similarly, electronically administering the second FAF signal to the second subject may include concurrently electronically administering the second FAF signal to the first and second subjects while the second subject is speaking, which may improve both the first subject's reading ability and/or comprehension and the second subject's reading ability and/or comprehension (Block 307'). Moreover, although FIGS. 3A and 3B only indicate first and second subjects, it will be understood that if three or four subjects are connected to the multi-user portable electronic device 100, then all three or all four subjects (e.g., wearing corresponding headsets $H_1$-$H_4$) may concurrently receive every FAF signal generated by the multi-user portable electronic device 100, regardless of which one of the subjects is speaking.

For example, referring now to FIG. 3C, FIG. 3C includes Blocks 301, 302, and 304-306 of FIG. 3B, and further includes Blocks 303" and 307", which are modifications of Blocks 303' and 307' of FIG. 3B, respectively. In particular, Blocks 303" and 307" of FIG. 3C illustrate that, in some embodiments, each of the FAF signals may be administered to four subjects concurrently.

Additionally or alternatively, the multi-user portable electronic device 100 may provide auditory speech signals to each of the subjects before the multi-user portable electronic device 100 converts the auditory speech signals to FAF signals, regardless of which one of the subjects is speaking.

As described herein, the multi-user portable electronic device 100 may serially receive auditory speech signals from a plurality of subjects. The auditory speech signals may be received as analog signals. For example, the multi-user portable electronic device 100 may receive an analog auditory speech signal from a subject at a particular frequency. The multi-user portable electronic device 100 may then electronically alter the particular frequency by: (a) electronically converting the received analog auditory speech signal to a digital signal in a frequency domain; (b) electronically altering the frequency of the digital signal within a range of +/−2 octaves; and (c) electronically converting the altered digital signal back to a time domain and into an analog signal to generate a FAF signal that can be administered to one or more subjects. Moreover, the FAF signal may be generated and administered without any substantial (e.g., programmably defined) delay.

F. Exemplary Operation of the Multi-User Portable Electronic Device 100

According to various embodiments described herein, a plurality of subjects may take turns reading aloud using the multi-user portable electronic device 100 and the microphones 50 that are selectively, serially activated (e.g., one at a time). In particular, a subject wearing a headset H may read aloud into a microphone 50 of the headset H, and the multi-user portable electronic device 100 may responsively administer a FAF signal to the headset H. In some embodiments, the multi-user portable electronic device 100 may administer the FAF signal of one subject to a plurality of the headsets $H_1$-$H_4$, and may thereby stimulate phonological processing brain mechanisms in a plurality of subjects simultaneously. Accordingly, the multi-user portable electronic device 100 may improve the reading abilities of a plurality of subjects simultaneously, even though only one of the subjects' microphone 50 is active or will be active at a given time.

It is contemplated that the multi-user portable electronic device 100 may improve the subjects' reading abilities by multiple grade levels (e.g., one to four grade levels) immediately (i.e., after a single use/reading session) or within a school year over multiple sessions.

The multi-user portable electronic device 100 may therefore effectively and efficiently improve the reading abilities of a plurality of subjects. Additionally, the portability of the multi-user portable electronic device 100, the high quality of the FAF signals administered by the multi-user portable electronic device 100, and the combinability of the multi-user portable electronic device 100 with the electronic device 120 including the display 122 may make the multi-user portable electronic device 100 relatively easy for a user to use with subjects.

Figure 4B:
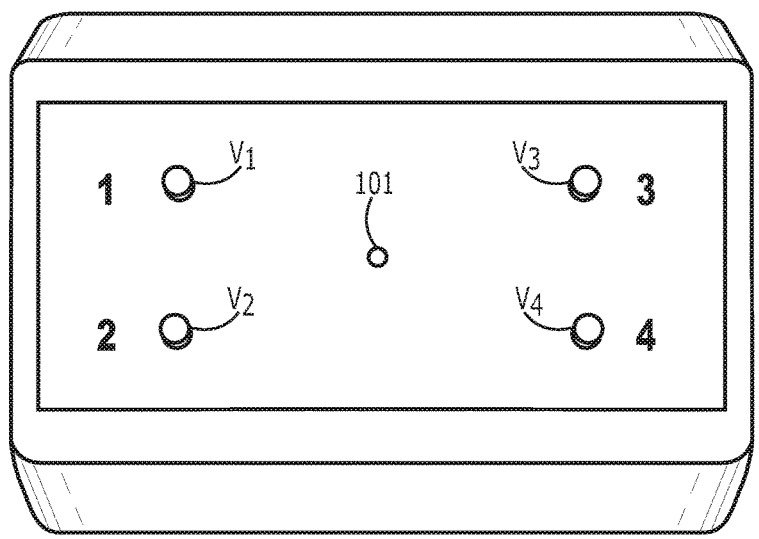
Figure 4C:
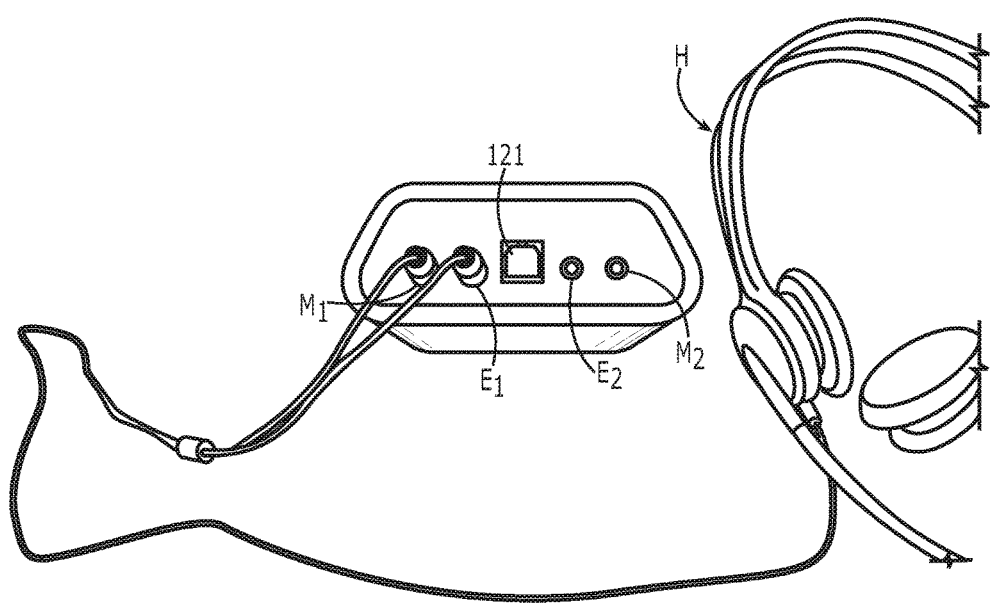

FIGS. 4A-4D provide images of different views/angles of an example of a compact, portable multi-user portable electronic device 100 that accommodates up to four headsets $H_1$-$H_4$. FIGS. 4A and 4C illustrate a headset H connected to the multi-user portable electronic device 100 using separate microphone and earphone audio ports M, E. For example, FIG. 4A illustrates that the cable 111 of a headset H may include individual (e.g., discrete) microphone and earphone cables 112, 113 that are configured to communicate microphone and earphone signals, respectively. The individual microphone and earphone audio cables 112, 113 may provide increased durability in comparison with a single cable that carries both microphone and earphone signals. Accordingly, the multi-user portable electronic device 100 may include separate microphone and earphone audio ports M ($M_1$-$M_4$), E ($E_1$-$E_4$) for each of the headsets $H_1$-$H_4$. As an example, FIG. 4A illustrates a second microphone audio port $M_2$ and a second earphone audio port $E_2$ that may be used to releasably connect the multi-user portable electronic device 100 and the second headset $H_2$.

Figure 4D:
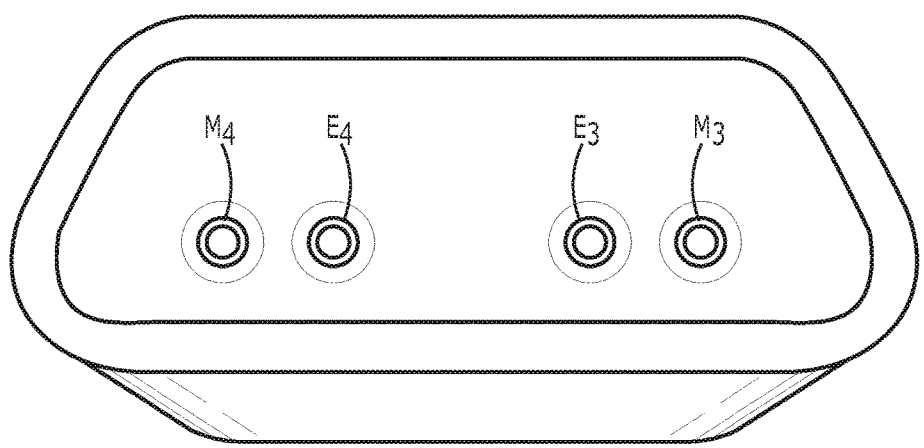

FIG. 4B illustrates a view of the top external surface of the multi-user portable electronic device 100, which includes four visual indicators $V_1$-$V_4$ and a button (which may be the switch 101) therebetween. FIG. 4C illustrates a side of the multi-user portable electronic device 100 that includes microphone and earphone audio ports ($M_1$ and $E_1$, and $M_2$ and $E_2$) for the first and second headsets $H_1$ and $H_2$, as well as a USB port (which may be the data interface 121). FIG. 4D illustrates a side of the multi-user portable electronic device 100 that is opposite the side illustrated in FIG. 4C. In particular, FIG. 4D illustrates a side that includes microphone and earphone audio ports ($M_3$ and $E_3$, and $M_4$ and $E_4$) for the third and fourth headsets $H_3$ and $H_4$. Moreover, although some subjects may become distracted if more than four subjects use the multi-user portable electronic device 100 together, it will be understood that, in some embodiments, more or fewer than four subjects may use the same multi-user portable electronic device 100 simultaneously.

In the present specification, various embodiments of the inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the inventive concepts. The inventive concepts are defined by the following claims, with equivalents of the claims to be included therein.

That which is claimed is:

1. A method for improving reading comprehension for a plurality of subjects, comprising:
providing a multi-user portable device with a circuit that is concurrently in communication with a plurality of different microphones and/or headsets of different subjects being treated for improving reading comprehension;
electronically activating a first microphone of the different microphones associated with a first subject using the circuit of the portable device;
electronically receiving an auditory speech signal of the first subject using the first microphone and the circuit of the portable device;
electronically altering the received auditory speech signal to generate a first frequency altered auditory speech feedback (FAF) signal using the circuit of the portable device;
electronically administering the first FAF signal to the first subject through a first headset of the different headsets while the first subject is speaking using the circuit of the portable device to improve the first subject's reading comprehension; then electronically activating a second microphone of the different microphones associated with a second subject using the circuit of the portable device while concurrently deactivating the first microphone associated with the first subject using the circuit of the portable device;

electronically receiving an auditory speech signal of the second subject using the second microphone and the circuit of the portable device;

electronically altering the received auditory speech signal of the second subject to generate a second FAF signal using the circuit of the portable device; and electronically administering the second FAF signal to the second subject through a second headset of the different headsets while the second subject is speaking using the circuit of the portable device to improve the second subject's reading comprehension.

2. The method of claim 1, wherein the electronically administering the first FAF signal to the first subject is carried out to electronically administer the first FAF signal concurrently to the first and second subjects while the first subject is speaking via the first and the second of the headsets to thereby improve the first and second subjects' reading comprehension using the first FAF signal such that the electronically administering the first and second FAF signals are carried out as a therapeutic treatment to improve reading comprehension of at least one non-reading subject.

3. The method of claim 2, wherein the electronically administering the second FAF signal to the second subject is carried out to electronically concurrently administer the second FAF signal to the first and second subjects while the second subject is speaking subjects via the first and second of the headsets to thereby improve the first and second subjects' reading comprehension using the second FAF signal.

4. The method of claim 1, wherein the activating steps are carried out using an externally accessible manual switch onboard the portable device and serially activates the first and second microphones to generate the first and second FAF signals, and wherein the circuit of the portable device concurrently transmits the first and second FAF signals to the first and second headsets.

5. The method of claim 1, wherein the activating steps are carried out using a remote input associated with a display that is in communication with the portable device.

6. The method of claim 1, wherein electronically altering the received auditory speech signal of the first subject comprises:

electronically converting the received analog auditory speech signal to a digital signal in a frequency domain;

electronically altering the frequency of the digital signal within a range of +/−2 octaves; then electronically converting the altered digital signal back to a time domain and into an analog signal to generate the first FAF signal that is electronically administered to the first subject.

7. The method of claim 1, wherein the first microphone is attached to the first headset worn by the first subject and the second microphone is attached to the second headset worn by the second subject, wherein the circuit of the portable device is in communication with the first headset, the first microphone, the second headset and the second microphone and can transmit the first FAF signal to the second headset and the first headset concurrently.

8. The method of claim 6, wherein at least one of the steps of electronically converting the received analog signal, electronically altering the digital signal, and electronically converting the altered digital signal is at least partially carried out using the circuit of the portable electronic device.

9. The method of claim 8, wherein the portable electronic device wirelessly communicates with the first headset worn by the first subject.

10. The method of claim 8, wherein the portable electronic comprises cords that connect the first and second headsets to the portable device.

11. The method of claim 8, wherein each of the first and second subjects has a reading disorder, and wherein the steps of electronically administering are carried out as therapeutic treatment to improve the first and second subjects' reading comprehension.

12. The method of claim 1, further comprising programmably adjusting a frequency shift for the step of electronically altering the received auditory speech signal to generate the first FAF signal using an electronic device that includes a display.

13. The method of claim 1, wherein the first subject is a pre-school, primary school, elementary school, middle school, or high school age student.

14. The method of claim 13, wherein the method is carried out in a school setting.

15. The method of claim 1, wherein the first subject is a college student.

16. The method of claim 1, wherein the first subject is an adult with a reading disorder.

17. A system for improving reading comprehension for a plurality of subjects, comprising:

a plurality of headsets including at least first and second headsets;

a plurality of microphones including at least first and second microphones configured to communicate with the first and second headsets, respectively; and a portable electronic device configured to electronically communicate with the first and second microphones to selectively, serially generate a first frequency altered auditory speech feedback (FAF) signal associated with an auditory speech signal received by the first microphone and transmit the first FAF signal to the first and second headsets while the first subject is reading aloud, then a second FAF signal associated with an auditory speech signal received by the second microphone and transmit the second FAF signal to the first and second headsets while the second subject is reading aloud to thereby improve the first and second subjects' reading comprehension.

18. The system of claim 17, wherein the first and second subjects each concurrently, serially receive both the first and second FAF signals.

19. The system of claim 17, wherein the multi-user portable electronic device wirelessly communicates with the first and second headsets and/or microphones to generate the first and second FAF signals so that first and second frequencies, respectively, are shifted a desired amount within a range of between +/−2 octaves.

20. The system of claim 17, wherein the portable electronic device is a device that is releasably wired to the first and second headsets and/or microphones to generate the first and second FAF signals so that first and second frequencies, respectively, are shifted a desired amount within a range of between +/−2 octaves.

21. The system of claim 17, wherein the system is configured to treat a school age student with a reading disability, to improve reading comprehension.

22. The system of claim 17, wherein the system is configured to treat an adult with a reading disability, to improve reading comprehension.

23. A multi-user portable electronic device for improving reading comprehension for a plurality of subjects, comprising:
- a pitch shifter circuit configured to generate frequency altered auditory speech feedback (FAF) signals corresponding to auditory speech signals received from respective active microphones, and to concurrently transmit the FAF signals to the plurality of users while only one of the plurality of users is reading aloud, to improve reading comprehension; and
- a switch in communication with the circuit configured to activate the microphones selectively, serially.

24. The multi-user portable electronic device of claim 23, wherein each of the plurality of users receives each of the FAF signals including FAF signals generated from speech of other users.

25. The multi-user portable electronic device of claim 23, further comprising:
- a headset interface configured to transmit the auditory speech signals from the microphones and/or to transmit the FAF signals to headsets corresponding to the microphones; and
- a data interface configured to communicate with an electronic device that includes a display and a software application that manages the multi-user portable electronic device.

26. The multi-user portable electronic device of claim 25, wherein the software application is configured to open when the software application detects that the multi-user portable electronic device is connected to the electronic device that includes the display and the software application.

27. The multi-user portable electronic device of claim 25, wherein the software application includes a graphical user interface that is configured to allow a user to selectively start and/or stop processing of the auditory speech signals, and/or adjust volume levels of the auditory speech signals and/or the FAF signals.

28. The multi-user portable electronic device of claim 25, wherein:
- the data interface comprises a Universal Serial Bus (USB) port;
- the electronic device that includes the display and the software application comprises a desktop, laptop, tablet, netbook, or notebook computer, or a smart phone; and
- the software application is stored in releasable media in and/or a non-transitory memory of the desktop, laptop, tablet, netbook, notebook computer, or smart phone.

29. The multi-user portable electronic device of claim 28, wherein the software application is configured to track the FAF signals and to generate charts and/or graphs on the display to illustrate reading comprehension progress of the plurality of subjects.

30. The multi-user portable electronic device of claim 25, wherein the software application provides programmable selection and/or adjustment of the FAF signals.

31. The multi-user portable electronic device of claim 28, further comprising a non-volatile memory, wherein the multi-user portable electronic device is fully functional only in response to cooperation between the software application and a license file stored in the non-volatile memory.

32. The multi-user portable electronic device of claim 31, wherein the license file corresponds to a license that expires, such that the multi-user portable electronic device can be deactivated or is configured to be fully functional only before the license expires.

33. The multi-user portable electronic device of claim 25, wherein the headset interface comprises a plurality of headset ports configured to concurrently connect the multi-user portable electronic device with between two and six headsets.

34. The multi-user portable electronic device of claim 33, wherein the headset ports are configured to receive the auditory speech signals from the microphones and to transmit the FAF signals to earphones of the headsets.

35. The multi-user portable electronic device of claim 23, wherein the switch is operable by a single external switch input, the device further comprising a housing comprising a plurality of spaced apart visual indicators on an upper surface thereof, one for each microphone which respectively illuminate to indicate a corresponding activated microphone.

36. The multi-user portable electronic device of claim 35, wherein the device has a portable housing, and wherein the visual indicator comprises Light Emitting Diodes (LEDs) held by the housing that serially illuminate to indicate which microphone is active.

37. The multi-user portable electronic device of claim 25, further comprising a digital-to-analog converter configured to convert digital audio signals generated by the software application and/or the multi-user portable electronic device into analog audio signals to be transmitted to the headsets, wherein the analog audio signals comprise the FAF signals.

38. The multi-user portable electronic device of claim 25, further comprising an on-board microphone biasing and input amplifier circuit configured to process the auditory speech signals received from the headsets.

39. The multi-user portable electronic device of claim 25, further comprising an on-board headset amplifier circuit configured to amplify the FAF signals that are to be transmitted to the headsets.

* * * * *